US012511926B2

(12) United States Patent
Singaraju et al.

(10) Patent No.: US 12,511,926 B2
(45) Date of Patent: Dec. 30, 2025

(54) DATA CATEGORIZATION USING TOPIC MODELLING

(71) Applicant: Oracle Financial Services Software Limited, Mumbai (IN)

(72) Inventors: Dakshayani Singaraju, Tirupati (IN); Krishna Sameera Ellendula, Sangareddy (IN); Veresh Jain, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 311 days.

(21) Appl. No.: 18/153,046

(22) Filed: Jan. 11, 2023

(65) Prior Publication Data
US 2024/0233427 A1    Jul. 11, 2024

(51) Int. Cl.
*G06V 30/41*    (2022.01)
*G06F 40/154*    (2020.01)
(Continued)

(52) U.S. Cl.
CPC ...... *G06V 30/19173* (2022.01); *G06F 40/154* (2020.01); *G06F 40/242* (2020.01);
(Continued)

(58) Field of Classification Search
CPC ........ G06V 30/00–43; G06V 10/70–87; G06F 40/00–58; G06T 7/10; G06T 5/20
See application file for complete search history.

(56) References Cited

U.S. PATENT DOCUMENTS 6,167,409 A * 12/2000 DeRose ................ G06F 16/958
    707/E17.116
8,090,724 B1 * 1/2012 Welch .................. G06V 30/268
    707/750

(Continued)

OTHER PUBLICATIONS

"Chapter 7. Classification, Categorization, and Tagging", Available Online at: https://urldefense.com/v3/_https://livebook.manning.com/book/taming-text/chapter-7/12_;!!NknhfzgzgQ!1SEcCsEJf9IXcNqprZYZY8EJfPQ1X-WcmU3A8aYUW3x8R3h-7OCiXli7Aaya16ANOtKyhoXpmskGk HkljWlqLaiHKUQ6eN3Lyw$, Accessed from internet on Dec. 2, 2022, 79 pages.

(Continued)

*Primary Examiner* — Sean T Motsinger
(74) *Attorney, Agent, or Firm* — Kilpatrick Townsend & Stockton LLP

(57) ABSTRACT

Method includes obtaining historical document images including text that correspond to different document classes; and generating a dictionary using text of the historical document images. The dictionary includes base words occurring with a greatest frequency in each document class. The base words are extracted from the text of the historical document images and arranged in datasets by a document class, where each dataset includes the base words of a same document class that occur with the greatest frequency within that document class. Trie structure is generated using the base words of the datasets that occur with a greatest frequency in each dataset. The trie structure includes internal nodes including root node and leaf nodes in which keys corresponding to the base words occurring with the greatest frequency in each dataset are respectively stored in predefined order. The trie structure is searchable in the predefined order starting with the root node.

18 Claims, 22 Drawing Sheets

(51) Int. Cl.
  *G06F 40/242* (2020.01)
  *G06T 5/20* (2006.01)
  *G06T 7/10* (2017.01)
  *G06V 30/19* (2022.01)

(52) U.S. Cl.
  CPC .................. *G06T 5/20* (2013.01); *G06T 7/10* (2017.01); *G06V 30/19093* (2022.01)

(56) References Cited

U.S. PATENT DOCUMENTS

| | | | | |
|---|---|---|---|---|
| 8,458,198 | B1* | 6/2013 | Welch | G06V 30/268 |
| | | | | 707/750 |
| 9,336,192 | B1* | 5/2016 | Barba | G06F 40/284 |
| 10,565,351 | B2* | 2/2020 | Nossal | G16H 40/20 |
| 11,886,533 | B2* | 1/2024 | Sheng | G06F 16/958 |
| 2003/0101187 | A1* | 5/2003 | Gaussier | G06V 10/7625 |
| 2006/0020603 | A1* | 1/2006 | Lo Turco | G06F 16/367 |
| 2006/0288275 | A1* | 12/2006 | Chidlovskii | G06F 16/83 |
| | | | | 715/236 |
| 2008/0249999 | A1* | 10/2008 | Renders | G06F 16/355 |
| 2009/0307213 | A1* | 12/2009 | Deng | G06F 16/35 |
| | | | | 707/999.005 |
| 2011/0282858 | A1* | 11/2011 | Karidi | G06F 16/353 |
| | | | | 707/E17.108 |
| 2016/0147747 | A1* | 5/2016 | Chulinin | G06F 40/268 |
| | | | | 704/7 |
| 2016/0188541 | A1* | 6/2016 | Chulinin | G06F 40/295 |
| | | | | 704/8 |
| 2016/0267323 | A1* | 9/2016 | Chulinin | G06V 30/268 |
| 2017/0061085 | A1* | 3/2017 | Nossal | G06F 40/211 |
| 2023/0074771 | A1* | 3/2023 | Nefedov | G06F 16/9024 |
| 2024/0233427 | A1* | 7/2024 | Singaraju | G06V 30/19173 |

OTHER PUBLICATIONS

"Document Classification in an Automated Data Extraction Solution", Available Online at: https://urldefense.com/v3/_https://docsumo.com/blog/auto-document-classification__;!!NknhfzgzgQ!1SEcCsEJf9IXcNqprZYZY8EJfPQ1X-WcmU3A8aYUW3x8R3h-7OCiXli7Aaya16ANOtKyhoXpmskGkHkljWlqLaiHKUSOhCfRPw$, Oct. 21, 2022, pp. 1-10.

Chen et al., "Comparative Text Analytics via Topic Modeling in Banking", Available Online at: http://www.cs.rpi.edu/~zaki/PaperDir/CIFER17.pdf, Nov. 2017, 8 pages.

* cited by examiner

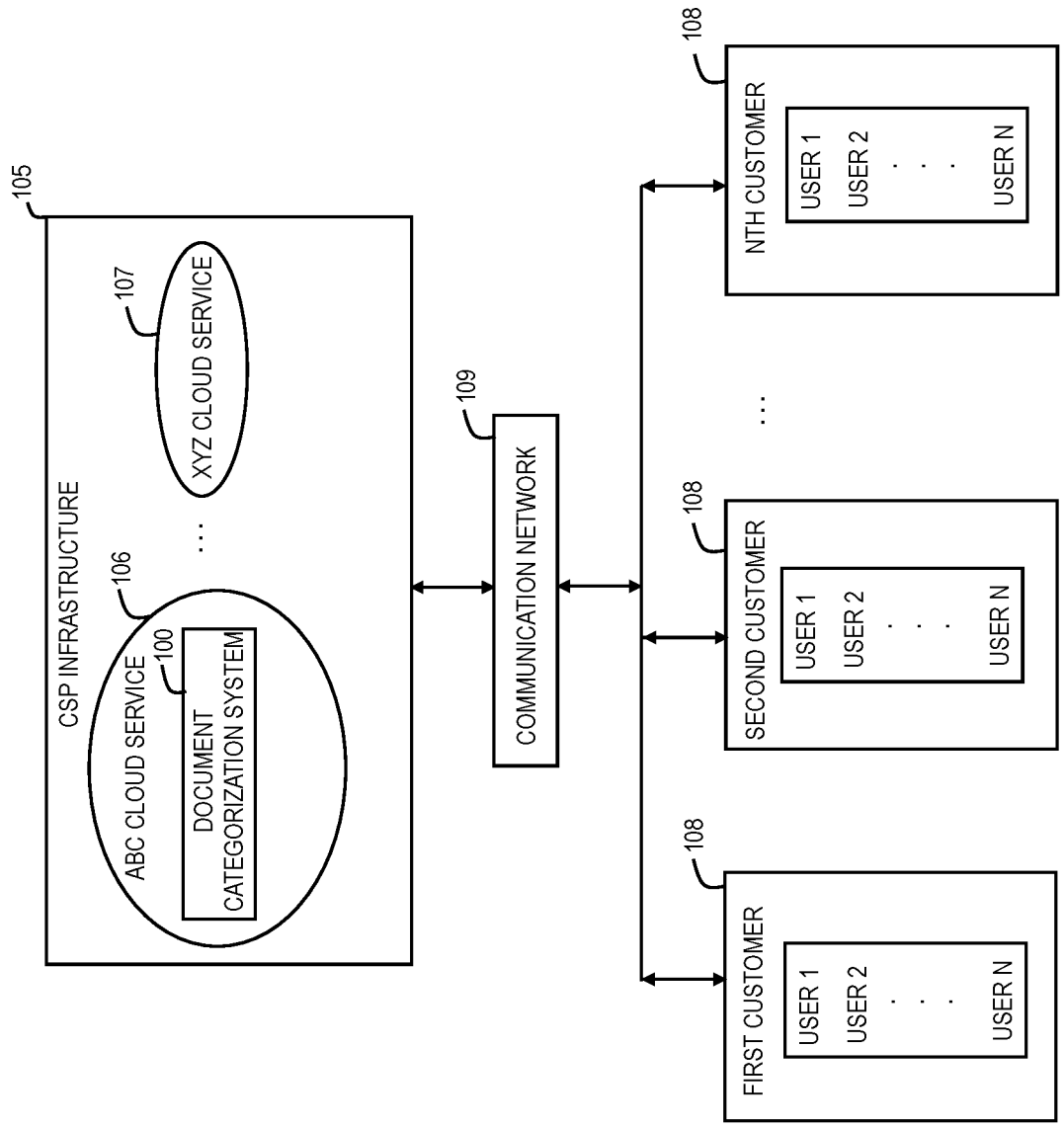

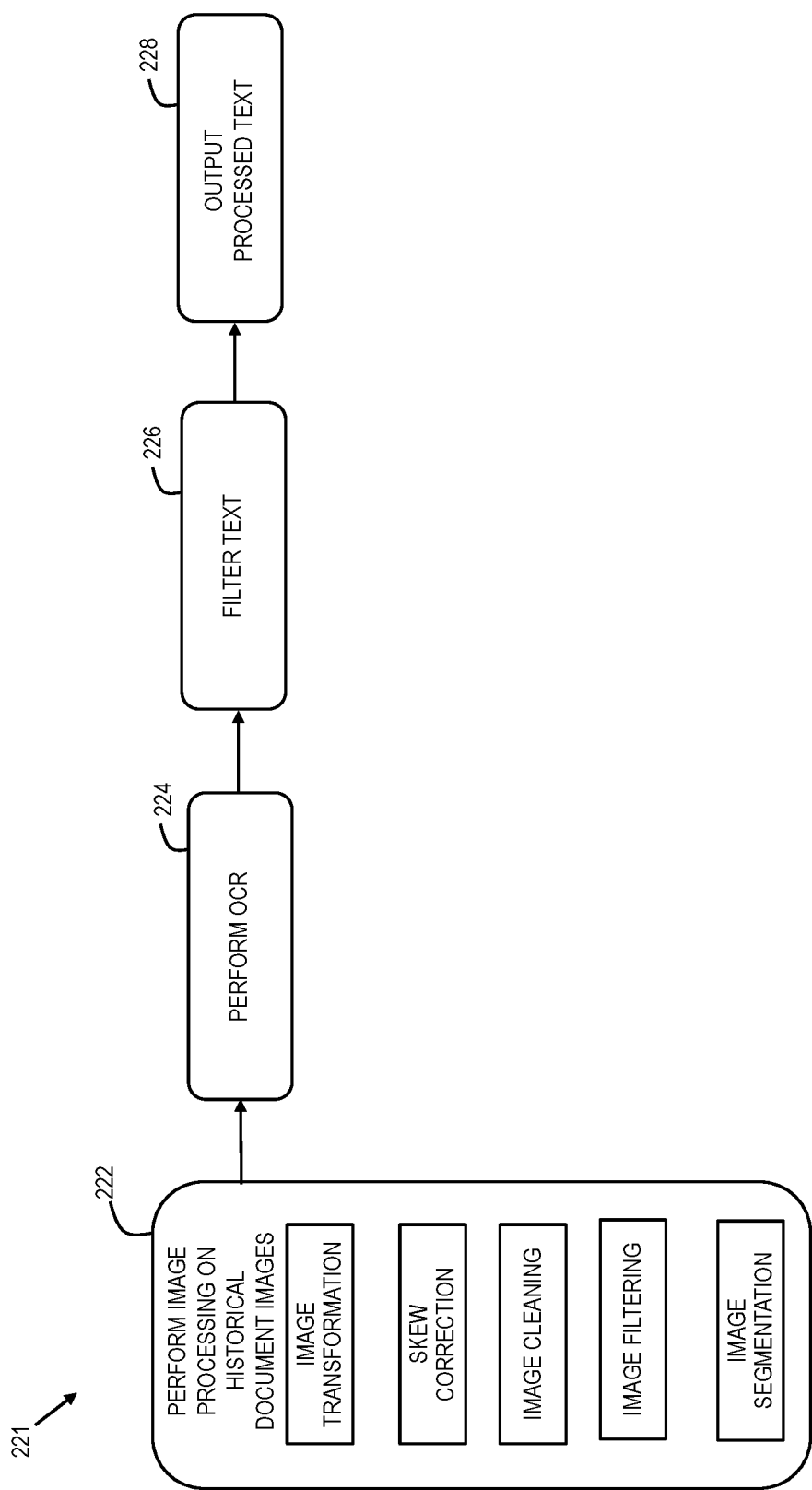

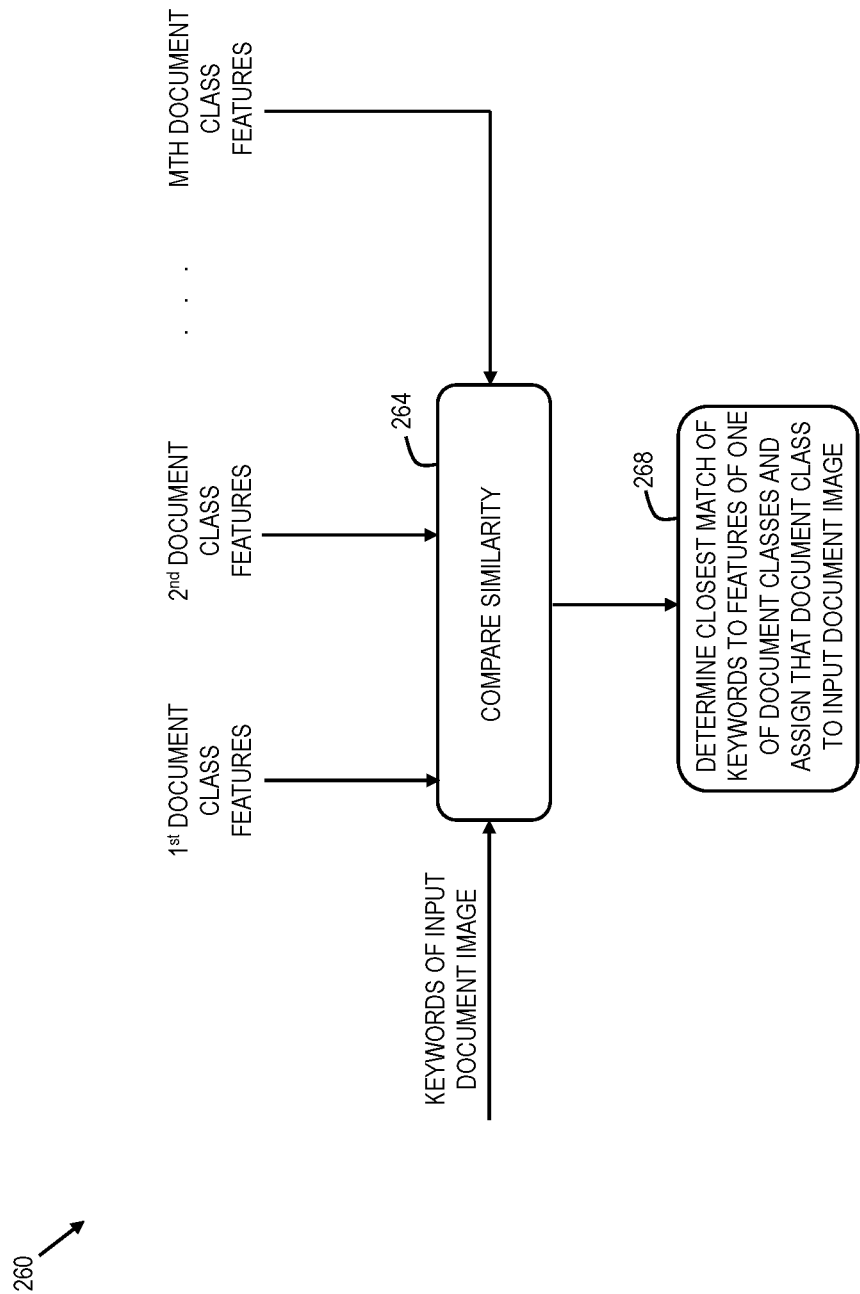

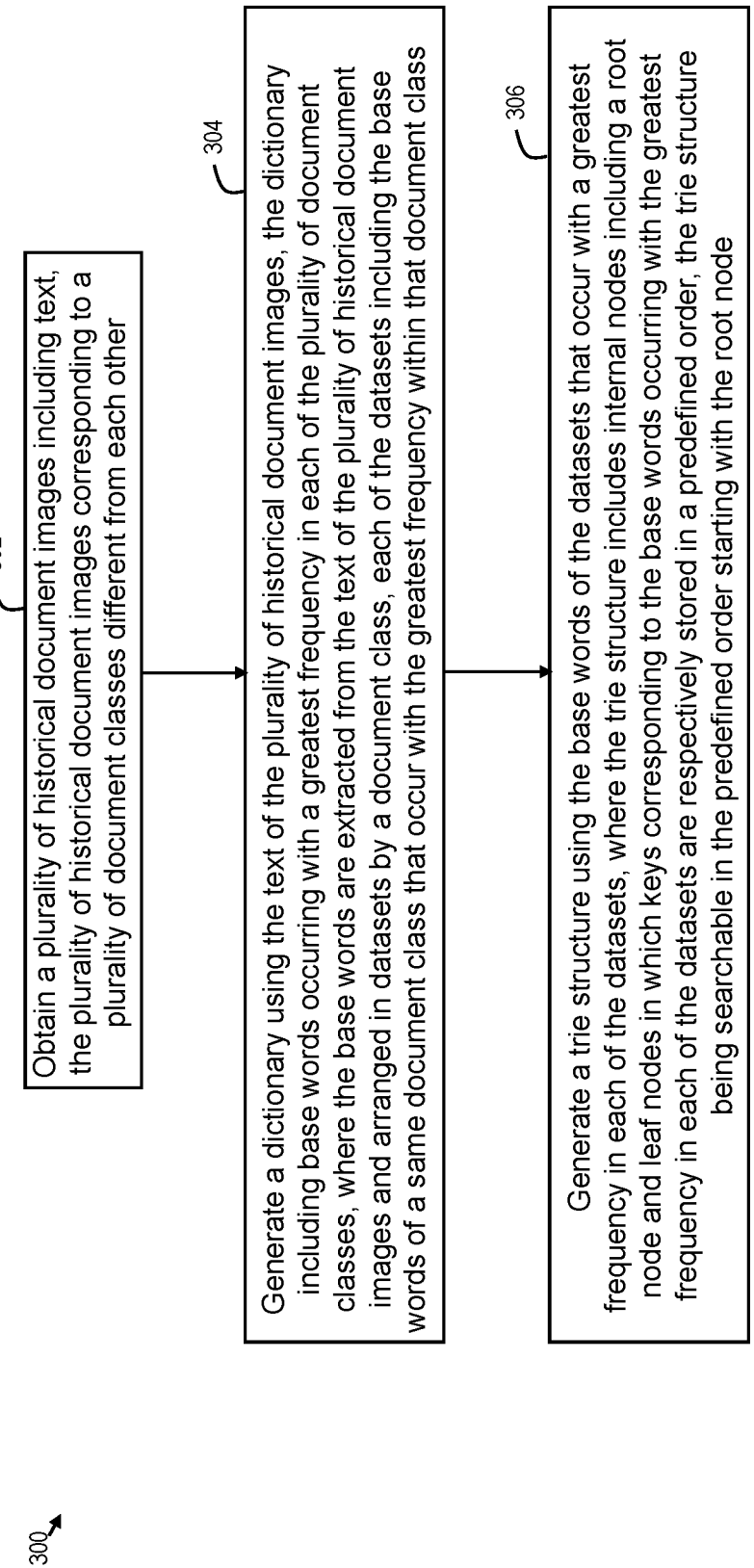

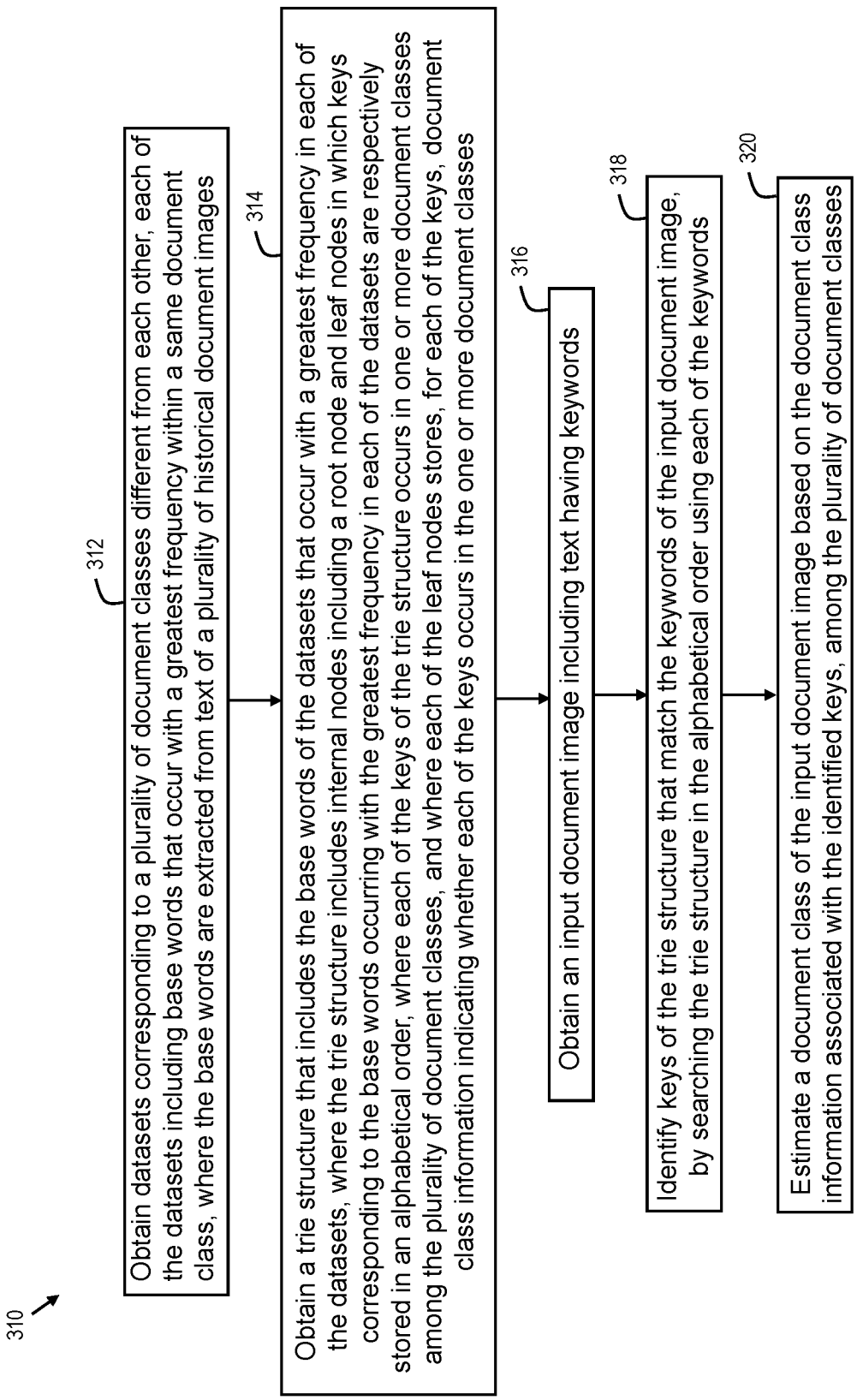

FIG. 10

| | 2nd Document Class Keyword Frequency | 2nd Document Class Keyword Weight | 3rd Document Class Keyword Frequency | 3rd Document Class Keyword Weight |
|---|---|---|---|---|
| Name | 20 | 1 | 40 | 2 |
| Account balance | 18 | 0.9 | 10 | 0.5 |
| Account id | 15 | 0.75 | 18 | 0.9 |
| Address | 18 | 0.9 | 12 | 0.6 |
| Invoice | 12 | 0.6 | 19 | 0.95 |

| Product weight | 0.365 | 0.513 |
|---|---|---|

DATA CATEGORIZATION USING TOPIC MODELLING

FIELD

The present disclosure relates generally to artificial intelligence techniques, and more particularly, to topic categorization of text using topic modelling.

BACKGROUND

Artificial intelligence (AI) and machine learning (ML) have many applications. For example, using artificial intelligence models or algorithms, content, e.g., text of the document, can be categorized into topics, where each document or a portion of the document may be assigned a topic.

In recent years, a plurality of systems and methods have been developed that could predict a topic of the document, e.g., text, using ML models. This is done by detecting an intent or a theme, e.g., a topic, from the given text, or a given set of sentences or paragraphs. A common topical pattern across the text may be determined using contextual relationship of the words in the text. After a common topic is detected, the text can be categorized into a certain topic.

However, texts present in some types of the documents contain little meaningful contextual information that can be extracted and used by the ML models. The examples of such documents include documents structured as key-value pairs, e.g., passports, identification cards, bank statements, etc. In such documents, it is difficult to find an intent or a theme and detect the topic of the text. Additionally, the documents even within the same class (e.g., bank statements) typically have variable context, inconsistent terminology, and inconsistent formats. Further, the content data in the documents can be abbreviated or obfuscated. Further, some of the documents, e.g., documents in financial, security, medical domains, are available in fewer amounts since most of the data is private and confidential.

In order for the model to predict a topic of the text accurately and reliably, a dataset containing a large amount of high quality data is needed to be provided to the model for training. The data in the dataset also has to be diverse covering various situations and different types of topics associated with the texts of the various document classes. The availability of such data is presently very limited due at least partially to the reasons discussed above.

As a result, data that is typically available for AI to predict the topic of the texts of the documents where no or little coherent contextual information is available, is very limited, leading to degraded performance (e.g., accuracy) of the ML algorithms tasked with predicting the topical substance of the document and consequently a document class.

SUMMARY

Techniques disclosed herein relate generally to artificial intelligence techniques. More specifically and without limitation, techniques disclosed herein relate to a novel technique for topic modelling to categorize unstructured data with no or little contextual information, to efficiently make accurate determinations regarding the documents' classes. Additionally, techniques described herein streamline the process of categorizing any document class by using a novel trie structure. Various embodiments are described herein to illustrate various features. These embodiments include various methods, systems, non-transitory computer-readable storage media storing programs, code, or instructions executable by one or more processors, and the like.

In various embodiments, a computer-implemented method is provided that includes obtaining a plurality of historical document images including text, the plurality of historical document images corresponding to a plurality of document classes different from each other; generating a dictionary using the text of the plurality of historical document images, the dictionary including base words occurring with a greatest frequency in each of the plurality of document classes, where the base words are extracted from the text of the plurality of historical document images and arranged in datasets by a document class, each of the datasets including the base words of a same document class that occur with the greatest frequency within that document class; and generating a trie structure using the base words of the datasets that occur with a greatest frequency in each of the datasets, where the trie structure includes internal nodes including a root node and leaf nodes in which keys corresponding to the base words occurring with the greatest frequency in each of the datasets are respectively stored in a predefined order, where the trie structure is searchable in the predefined order starting with the root node.

In some embodiments, the computer-implemented method further includes: prior to the generating the dictionary, extracting the text from the plurality of historical document images, the extracting including: performing an image processing on the plurality of historical document images, respectively, the image processing including at least one from among image transformation, skew correction, image cleaning, image filtering, and image segmentation; obtaining a text stream, by performing an optical character recognition (OCR) on the image-processed plurality of historical document images; and filtering the text stream.

In some embodiments, the text stream is one of a plurality of text streams, each of the plurality of text streams being obtained based on historical document images belonging a same document class, among the plurality of historical document images, and filtered, and the generating the dictionary further includes processing each of the plurality of text streams by: extracting, from a corresponding text stream, text units, each of the text units including one word or sequential words, for each corresponding text stream, forming N-gram groups, where N is a number from 1 to 4, where the text units including one word are associated with unigrams and form a unigram group, the text units including two sequential words are associated with bigrams and form a bigram group, the text units including three sequential words are associated with trigrams and form a trigram group, and the text units including four or more sequential words are associated with quadrams and form a quadram group, among the N-gram groups, arranging the text units of each of the N-gram groups in a descending frequency order, as an ordered group of the text units of a corresponding N-gram group, and selecting a predetermined number of the text units having a greatest frequency within each ordered group; and generating the datasets by the document class, each of the datasets including the selected text units of each of the N-gram groups of the corresponding text stream as the base words of a corresponding document class.

In some embodiments, the generating the trie structure further includes: arranging the base words in each of the datasets in a descending frequency order, as an ordered group of each dataset per document class; selecting a predetermined number of the base words having the greatest frequency within each ordered group, where the selected base words correspond to the keys; and storing the keys in an alphabetical order in the leaf nodes.

In some embodiments, each of the keys of the trie structure occurs in one or more document classes among the plurality of document classes, and each of the leaf nodes stores, for each of the keys, document class information indicating whether each of the keys occurs in the one or more document classes.

In some embodiments, the computer-implemented method further includes obtaining an input document image including text having keywords; identifying the keys of the trie structure that match the keywords of the input document image, by searching the trie structure in the alphabetical order using each of the keywords; and estimating a document class of the input document image based on the document class information associated with the identified keys, among the plurality of document classes.

In some embodiments, the estimating the document class further includes: calculating a similarity score between the input document image and the plurality of document classes, respectively, by summing, for each of the plurality of document classes, a number of times each of the keywords occurs in a corresponding document class, based on the document class information associated with the identified keys, thereby obtaining a plurality of similarity scores for the plurality of document classes, respectively; determining whether the plurality of similarity scores includes a greatest similarity score for one document class or multiple document classes, among the plurality of document classes; and based on the determining that the greatest similarity score corresponds to the one document class, classifying the input document image into the one document class associated with the greatest similarity score.

In some embodiments, determining further includes: determining that the plurality of similarity scores includes the greatest similarity score corresponding to the multiple document classes; and based on the greatest similarity score corresponding to the multiple document classes, classifying the input document image based on a frequency of the base words in each of the multiple document classes.

In some embodiments, the classifying the input document image based on the base words further includes: determining a keyword frequency for each of the keywords for each of the multiple document classes, the keyword frequency corresponding to the frequency with which the base words corresponding to the keywords occur in each of the multiple document classes; calculating a keyword weight for each of the keywords based on the keyword frequency and a total number of historical document images for each of the multiple document classes, among the plurality of historical document images, thereby obtaining a plurality of keyword weights for the multiple document classes, respectively; calculating a product weight for each of the multiple document classes, based on the plurality of keyword weights calculated for each of the multiple document classes; and classifying the input document image into a document class associated with a greatest value of the product weight among the multiple document classes.

In various embodiments, a computer-implemented method is provided that includes obtaining datasets corresponding to a plurality of document classes different from each other, respectively, each of the datasets including base words that occur with a greatest frequency within a same document class, where the base words are extracted from text of a plurality of historical document images; obtaining a trie structure that includes the base words of the datasets that occur with a greatest frequency in each of the datasets, where the trie structure includes internal nodes including a root node and leaf nodes in which keys corresponding to the base words occurring with the greatest frequency in each of the datasets are respectively stored in an alphabetical order, where each of the keys of the trie structure occurs in one or more document classes among the plurality of document classes, and where each of the leaf nodes stores, for each of the keys, document class information indicating whether each of the keys occurs in the one or more document classes; obtaining an input document image including text having keywords; identifying keys of the trie structure that match the keywords of the input document image, by searching the trie structure in the alphabetical order using each of the keywords; and estimating a document class of the input document image based on the document class information associated with the identified keys, among the plurality of document classes.

In some embodiments, the estimating the document class further includes: calculating a similarity score between the input document image and the plurality of document classes, respectively, by summing, for each of the plurality of document classes, a number of times each of the keywords occurs in a corresponding document class, based on the document class information associated with the identified keys, thereby obtaining a plurality of similarity scores for the plurality of document classes, respectively; determining whether the plurality of similarity scores includes a greatest similarity score for one document class or multiple document classes, among the plurality of document classes; and based on the determining that the greatest similarity score corresponds to the one document class, classifying the input document image into the one document class associated with the greatest similarity score.

In some embodiments, the determining further includes: determining that the plurality of similarity scores includes the greatest similarity score corresponding to the multiple document classes; and based on the greatest similarity score corresponding to the multiple document classes, classifying the input document image based on a frequency of the base words that occur in each of the multiple document classes and are stored in respective datasets.

In some embodiments, the classifying the input document image based on the base words further includes: determining a keyword frequency for each of the keywords for each of the multiple document classes, the keyword frequency corresponding to a frequency with which the base words corresponding to the keywords occur in each of the multiple document classes; calculating a keyword weight for each of the keywords based on the keyword frequency and a total number of historical document images for each of the multiple document classes, among the plurality of historical document images, thereby obtaining a plurality of keyword weights for the multiple document classes, respectively; calculating a product weight for each of the multiple document classes, based on the plurality of keyword weights calculated for each of the multiple document classes; and classifying the input document image into a document class associated with a greatest value of the product weight among the multiple document classes.

In some embodiments, the computer-implemented method further includes: prior to the obtaining the datasets, extracting the text from the plurality of historical document images, the extracting including: performing an image processing on the plurality of historical document images, respectively, the image processing including at least one from among image transformation, skew correction, image cleaning, image filtering, and image segmentation; obtaining a text stream, by performing an optical character recognition (OCR) on the image-processed plurality of historical document images; and filtering the text stream.

In some embodiments, the text stream is one of a plurality of text streams, each of the plurality of text streams being obtained based on historical document images belonging a same document class, among the plurality of historical document images, and filtered, and the computer-implemented method further includes processing each of the plurality of text streams by: extracting, from a corresponding text stream, text units, each of the text units including one word or sequential words, for each corresponding text stream, forming N-gram groups, where N is a number from 1 to 4, where the text units including one word are associated with unigrams and form a unigram group, the text units including two sequential words are associated with bigrams and form a bigram group, the text units including three sequential words are associated with trigrams and form a trigram group, and the text units including four or more sequential words are associated with quadrams and form a quadram group, among the N-gram groups, arranging the text units of each of the N-gram groups in a descending frequency order, as an ordered group of the text units of a corresponding N-gram group, and selecting a predetermined number of the text units having a greatest frequency within each ordered group; and generating the datasets by the document class, each of the datasets including the selected text units of each of the N-gram groups of the corresponding text stream as the base words of a corresponding document class.

In some embodiments, the obtaining the trie structure includes generating the trie structure by: arranging the base words in each of the datasets in a descending frequency order, as an ordered group of each dataset per document class; selecting a predetermined number of the base words having the greatest frequency within each ordered group, where the selected base words correspond to the keys; and storing the keys in the alphabetical order and the document class information associated with the keys in the leaf nodes.

In various embodiments, a system is provided that includes one or more data processors and a non-transitory computer readable storage medium containing instructions which, when executed on the one or more data processors, cause the one or more data processors to perform part or all of one or more methods disclosed herein.

In various embodiments, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 1B is a simplified block diagram of a document categorization system in a cloud service provider infrastructure according to various embodiments.

FIG. 2B is a flowchart of a method according to various embodiments.

FIG. 2D is a flowchart of a method according to various embodiments.

FIG. 3A is a flowchart of a method according to various embodiments.

FIG. 3B is a flowchart of a method according to various embodiments.

FIG. 10 depicts processing performed by the document categorization system according to various embodiments.

DETAILED DESCRIPTION

Figure 1A:
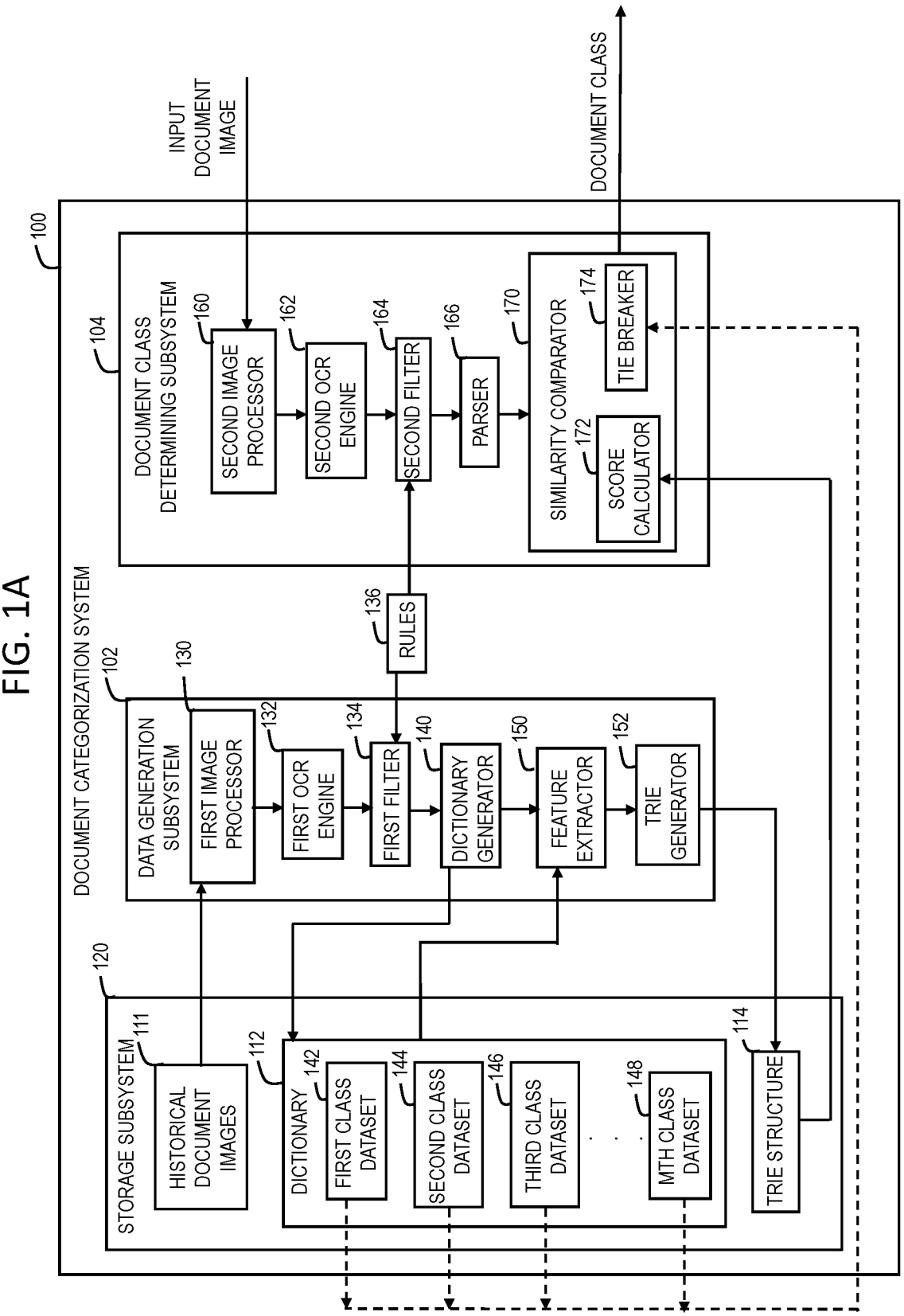
FIG. 1A is a block diagram of a document categorization system according to various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

The present disclosure relates generally to artificial intelligence techniques, and more particularly, to topic categorization of text (e.g., text having no meaningful contextual information) using topic modelling. Various embodiments are described herein, including methods, systems, non-transitory computer-readable storage media storing programs, code, or instructions executable by one or more processors, and the like. In certain implementations, techniques described herein use topic modelling to categorize unstructured data with no or little contextual information, to efficiently make accurate determinations regarding the documents' classes. Additionally, techniques described herein streamline the process of categorizing any document class by using a novel trie structure.

For purposes of this disclosure, a document image is an image of a document that may be generated using an imaging device such as a scanner (e.g., by scanning a document) or a camera (e.g., by a camera capturing an image of a document), and the like. A document image is different from a text-based document, which is a document created using a text editor (e.g., Microsoft WORD, EXCEL) and in which the contents of the document, such as words, tables, etc., are preserved in the document and are easily extractable from the document. In contrast, in a document image, the words, tables, etc., are lost and not preserved-instead, a document image includes pixels and the contents of the document are embedded in the values of the pixels.

Topic categorization is a process of predicting a topic of the text and then classifying the text into the topic. Topic categorization may be performed to understand the context and purpose of a specific document.

As mentioned in the Background section, topic prediction is typically done by using a model or models that can detect a topic from the given text, or a given set of sentences or paragraphs, determine a common topical pattern across the text using contextual relationship of the words in the text, and categorize the text into a certain topic. Typically, Natural Language Processing (NLP) models are used in topic prediction applications. The NLP model searches for keywords in the text, assigns weights to the keywords, and determines a topic based on a keyword with the greatest weight. Once the topic is determined, the content of the text can be summarized within the document, the documents can be sorted and stored by their topics, etc.

However, when the texts of the documents contain little meaningful contextual information that can be extracted and used by the NLP models, the NLP model cannot detect a topic with required levels of accuracy. Examples of such documents includes documents in tabular form and/or having key-value pairs, e.g., passports, identification cards, bank and credit card statements, invoices, receipts, driver's licenses, salary slips, tax returns, loan applications and associated documents, cashflow statements, employment applications and associated documents, credit reports, medical records, etc.

Further, to properly train the NLP model, a large quantity of diverse and high quality training data is necessary, e.g., 1000s of the documents corresponding to the same topic. However, in some domains (e.g., medical, financial, security, etc.), a large quantity of the documents is not available due to the confidential nature of the data.

As a result, training data, which is typically available for AI to predict the topic of the texts of the documents where no or little coherent contextual information is available, especially with respect to the certain domains, is very limited, leading to degraded performance (e.g., accuracy) of the ML algorithms tasked with predicting the topical substance of the document and consequently a document class.

The present disclosure describes solutions that are not plagued by the above-mentioned problems. The novel techniques described herein are for providing data categorization for the texts of the document images that include at least one from among key-value text, text with no sentences or punctuation, unstructured text, text with a lack of semantics, tabular data not processible by the NLP algorithms, and text where NLP approaches including tokenization, stemming, lemmatization, etc., do not suffice.

In certain implementations, the embodiments include a data preparation phase and a classification phase.

At the data preparation phase, a dictionary is generated using the text of the plurality of historical document images that include text and correspond to a plurality of document classes different from each other. The dictionary includes base words occurring with a greatest frequency in each of the plurality of document classes, where the base words are extracted from the text of the plurality of historical document images and arranged in datasets by a document class, each of the datasets including the base words of a same document class that occur with the greatest frequency within that document class.

In certain implementations, the historical document images are processed and arranged as text streams, each corresponding to a certain document class. The text units may be extracted from each text stream and may include one word or sequential words, e.g., a sequence of two or more words. N-gram groups can be formed for each corresponding text stream, where N may a number from 1 to 4. Accordingly, the text units including one word are associated with unigrams and form a unigram group, the text units including two sequential words are associated with bigrams and form a bigram group, the text units including three sequential words are associated with trigrams and form a trigram group, and the text units including four or more sequential words are associated with quadrams and form a quadram group. A predetermined number of the text units having a greatest frequency within each N-gram group of each text stream may be selected to be stored in the dictionary, e.g., in the datasets arranged by the document class, where each of the datasets includes, as the base words, the most frequently occurring text units of each N-gram group of the corresponding document class.

Based on the corpus saved in the dictionary, e.g., the datasets by the document class, a trie structure is generated using the base words that occur with a greatest frequency in each of the datasets per document class. The trie structure includes internal nodes including a root node and leaf nodes storing the keys. The keys correspond to the base words occurring with the greatest frequency in each of the datasets. As such, the keys stored in the leaf nodes occur in one or more document classes, and the leaf nodes also store document class information identifying these document classes for associated stored keys.

Further, the keys are stored in an alphabetical order in the leaf nodes, so that the trie structure can be searchable in the alphabetical order as a regular dictionary at the classification phase, to find keys corresponding to the keywords of the input document image and identify the document classes where those keywords occurring.

Accordingly, at the classification phase, the trie structure is searched in the alphabetical order for each identified keyword of the input document image that is received for classification, e.g., topic categorization. For each given document class, a similarity score is calculated with respect to the input document image, by counting a number of times each keyword occurs in that document class, e.g., by using the document class information of a corresponding matching key that is stored in the leaf node of the trie structure as described above. The document class having a greatest similarity score is then assigned as the document class to the input document image.

However, in some situations, few document classes might have the same "greatest" similarity score. In such situations, the base words most frequently occurring in each of the N-gram groups and stored in the dictionary may be used to resolve tie-scored document classes. In certain implementations, with reference to the dictionary, a keyword frequency for each of the keywords may be determined for each of the tie-scored document classes, where the keyword frequency corresponds to a frequency with which the base words corresponding to the keywords occur in each of the tie-scored document classes. Then, a keyword weight can be calculated for each keyword, based on the keyword frequency and a total number of historical document images for each of the tie-scored document classes. Based on the keyword weights for each of the tie-scored document classes, a product weight for each of the each of tie-scored document classes can be also calculated. The document class having a greatest product weight is then assigned as the document class to the input document image. This is described in detail below with reference to FIGS. 9 and 10.

The techniques described herein may be used for extraction of information and/or determining the actual topic of the text. For example, when a customer desires to apply for a loan, the customer may scan in a number of documents having different formats and data, e.g., a bank statement, a driver's license, a salary slip, a loan application, etc., that are all key-value pairs based documents and/or contain tabular data. Using the techniques described herein, the data of each document image provided by the customer may be categorized and a class of each document image may be determined. Then, the documents provided by the customer can be sorted and organized according to the document class, e.g., a topic.

The techniques described herein may also be used for sorting and organizing the document images of a plurality of customers, e.g., the salary slips, the bank statements, etc., by using the topic of each document image.

The techniques described herein may also be used for summarizing large texts, e.g., 200 pages of the document image, into one paragraph.

The techniques described herein may be also used for identifying topics of documents such as income statements, bank statements, cashflow, budget statements, credit reports, balance sheets, etc., that have completely tabular data with no paragraphs or contextual relationship.

The techniques described herein overcome the problem of a lack of training data described above, by categorizing data of a small number of documents per document class by performing topic modelling using N-grams on the text units extracted from the document images, where the text units occurring with a greatest frequency in each N-gram group of a corresponding document class are stored in a dictionary to be used as corpus for classifying the input document images into appropriate topics.

Further, the techniques described herein overcome the problem of a lack of training data for training a model for the topic categorization of the text by a novel technique of topic modelling that uses only a small number of document images of each document class—e.g., 20-30 document images per document class, as compared to 100s and 1000s document images per document class that are used to train the related art models used for topic categorization. The above is an improvement in functioning of the computer systems where the memory allocations and the computational intensity can be reduced.

Further, the novel technique of topic modelling allows to improve the efficiency and performance as compared to that of the related art topic models used for topic categorization by improving accuracy of document categorization and speed of searching the novel trie structure, thereby providing an improvement to the technical field of software arts as well as an improvement in functioning of the computer systems.

Additionally, the techniques described herein enable a user to upload different document images in bulk and classify them into their respective classes. The documents then may be sorted and assigned to proper personnel for reviewing, processing, and analysis. The techniques described herein reduce computational intensity of the computer systems by using a simple topic modelling based on N-grams, on a small number of document images per class, instead of using NLP models requiring intense computational resources and a large number of training data as in the related art.

Document Categorization System and Techniques Thereof

FIG. 1A is a simplified block diagram of a document categorization system 100 according to various embodiments. The document categorization system 100 may be implemented using one or more computer systems, each computer system having one or more processors. The document categorization system 100 may include multiple components and subsystems communicatively coupled to each other via one or more communication mechanisms. For example, in the embodiment depicted in FIG. 1A, the document categorization system 100 includes a data generation subsystem 102 and a document class determining subsystem 104. These subsystems may be implemented as one or more computer systems. The systems, subsystems, and other components depicted in FIG. 1A may be implemented in software (e.g., code, instructions, program) executed by one or more processing units (e.g., processors, cores) of the respective systems, using hardware, or combinations thereof. The software may be stored on a non-transitory storage medium (e.g., on a memory device). The document categorization system 100 depicted in FIG. 1A is merely an example and is not intended to unduly limit the scope of embodiments. Many variations, alternatives, and modifications are possible. For example, in some implementations, the document categorization system 100 may have more or fewer subsystems or components than those shown in FIG. 1A, may combine two or more subsystems, or may have a different configuration or arrangement of subsystems. The document categorization system 100 and subsystems depicted in FIG. 1A may be implemented using one or more computer systems, such as the computer system depicted in FIG. 13.

As shown in FIG. 1B, the document categorization system 100 may be a part of a cloud service provider (CSP) infrastructure 105 provided by a CSP for providing one or more cloud services. For example, the one or more cloud services may include ABC cloud service 106 to XYZ cloud service 107 connected to computers of one or more customers 108 via a communication network 109. For example, the document categorization system 100 may be a part of the ABC cloud service 106.

For example, the customers 108 may provide real-world input documents (e.g., as images, PDF files, etc.) to the CSP infrastructure 105 via the communication network 109. Based on the input document, e.g., corresponding to an invoice, the document categorization system 100 can correctly classify the input document into the class "invoice."

Figure 12:
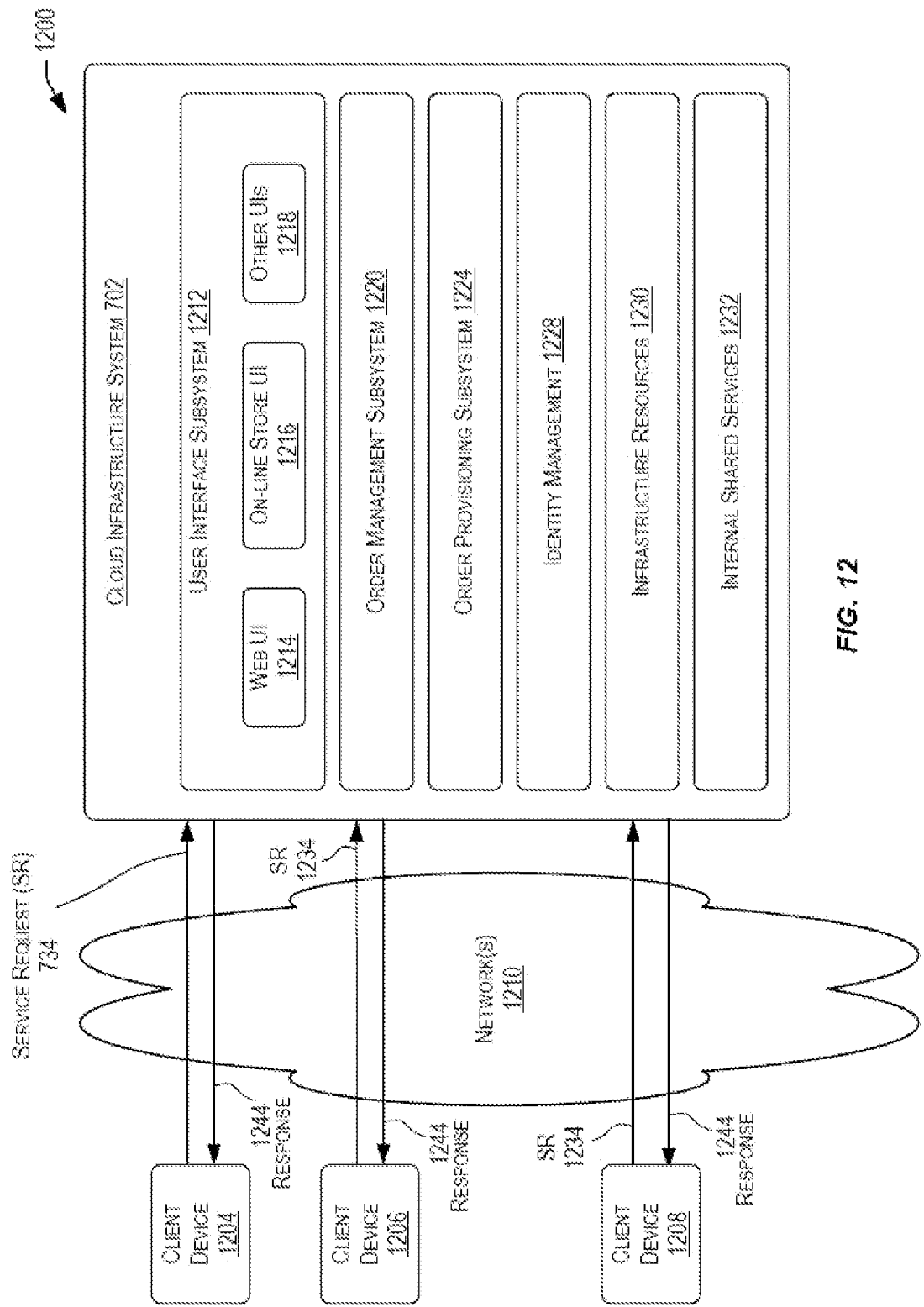
FIG. 12 is a simplified block diagram of one or more components of a system environment by which services provided by one or more components of an embodiment system may be offered as cloud services, in accordance with various embodiments.

Example of the cloud infrastructure architecture provided by the CSP is depicted in FIG. 12 and described in detail below.

Figure 1C:
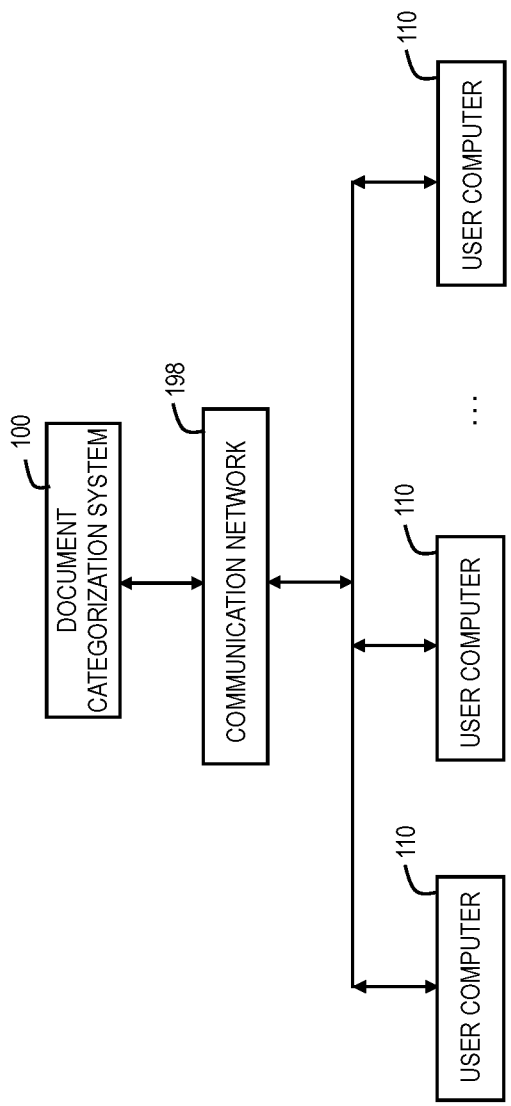
FIG. 1C is a simplified block diagram of a document categorization system in a distributed computing environment according to various embodiments.

As shown in FIG. 1C, the document categorization system 100 can be provided as a part of a distributed computing environment, where the document categorization system 100 is connected to one or more user computers 110 via a communication network 109.

Figure 11:
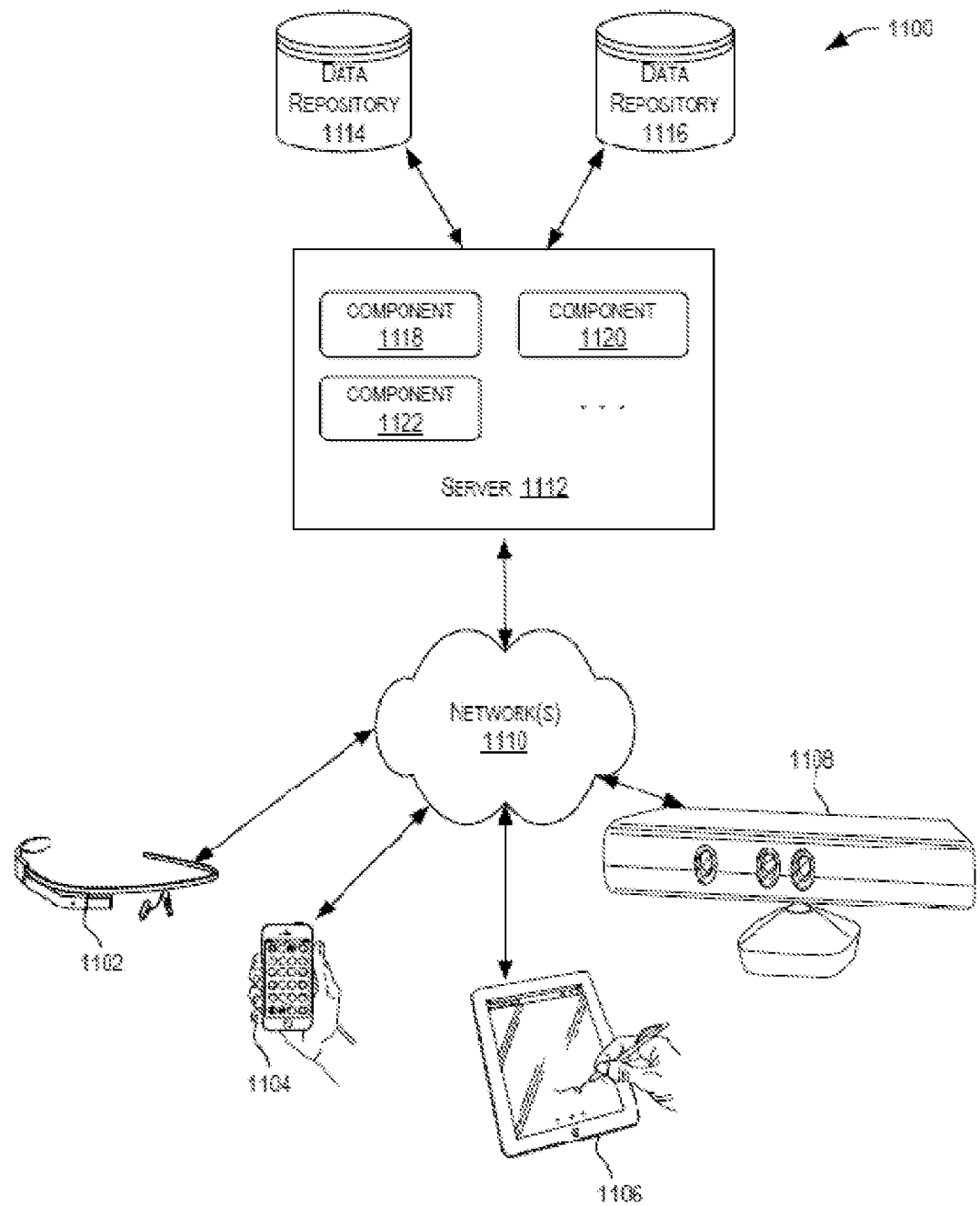
FIG. 11 depicts a simplified diagram of a distributed system for implementing various embodiments.

An example of the distributed computing environment is depicted in FIG. 11 and described in detail below.

The document categorization system 100 is configured to perform processing corresponding to a data preparation phase and a classification phase.

During the data preparation phase, the document categorization system 100 receives, as an input, historical document images 111, processes the historical document images 111, and generates a dictionary 112 containing base words determined to correspond to each of the document classes of the historical document images 111, and a trie structure 114 storing, as keys, the base words most frequently occurring in each document class. During the classification phase, using the knowledge of the base words and their corresponding document classes, e.g., the features corresponding to each of the document classes, the document categorization system 100 is configured to classify an input document image into a certain document class using trie structure 114. As used herein, the input document image refers to one or more document images provided by one or more customers for the classification. As used herein, the base words may include one word or a sequence of words that most frequently occur per document class and are representative features of the documents corresponding to each document class.

As used herein, the document classes refer to the types of the documents and may include, without limitation, an invoice, a bank statement, a credit card statement, a receipt, a driver's license, a loan application, a passport, a driver's license, a salary slip, a credit report, a tax return, a cashflow statement, an employment application, a medical record, etc.

As shown in FIG. 1A, the document categorization system 100 includes a storage subsystem 120 that may store the various data constructs and programs used by the document categorization system 100. For example, the storage subsystem 120 may store the historical document images 111, the dictionary 112, and the trie structure 114. However, this is not intended to be limiting. In alternative implementations, the historical document images 111, the dictionary 112, and/or the trie structure 114 may be stored in other memory storage locations (e.g., different databases) that are accessible to the document categorization system 100, where these memory storage locations can be local to or remote from the document categorization system 100. In addition, other data used by the document categorization system 100 or generated by the document categorization system 100 as a part of its functioning may be stored in the storage subsystem 120. For example, information identifying various threshold(s) used by or determined by the document categorization system 100 may be stored in the storage subsystem 120.

In some implementations, the processing at the data preparation phase and the classification phase are performed by the data generation subsystem 102 and the document class determining subsystem 104, respectively. Each of the data preparation phase and the classification phase and the functions performed by the data generation subsystem 102 and the document class determining subsystem 104 are described below in more detail.

I. Data Preparation Phase

The data generation subsystem 102 is configured to perform the processing corresponding to the data preparation phase. The data generation subsystem 102 receives, as an input, the historical document images 111. The data generation subsystem 102 performs processing on the historical document images 111 that results in the generation of the dictionary 112 and the trie structure 114 that are then output by the data generation subsystem 102. The dictionary 112 and/or the trie structure 114 is used, as an input, at the classification phase by the document class determining subsystem 104, to assign a document class to the input document image. In some implementations, the dictionary 112 and/or the trie structure 114 may be stored in the storage subsystem 120.

In some embodiments, the data generation subsystem 102 receives sets of the historical document images 111, where the historical document images 111 included in each set correspond to a same document class and each set includes a collection of the historical document images of a different document class. The data generation subsystem 102 then performs processing on each set of the historical document images 111 in parallel, at least partially in parallel, or sequentially. The number of sets of the historical document images 111 (e.g., a number of document classes being processed) and a number of document images in each set may be determined by a user. In an example, the number of the document classes may be 5, and the number of the historical document images 111 in each document class may be 20. However, this is not intended to be limiting, and the numbers of the document classes and the historical document images 111 may be different from 5 and 20, respectively, e.g., 4 and 25, 10 and 30, etc.

(a) Extraction of Text from Historical Document Images

In certain implementations, the data generation subsystem 102 includes a first image processor 130. The first image processor 130 receives, as an input, the set of the historical document images 111 that corresponds to a certain document class and performs image processing on the historical document images 111 of the received set. However, this is not intended to be limiting. The first image processor 130 may receive, as an input, the sets of the historical document images 111, where each of the sets includes the historical document images 111 corresponding to a different document class. The first image processor 130 then performs processing on each set of the historical document images 111 in parallel, at least partially in parallel, or sequentially. For example, the first image processor 130 performs, on the historical document images 111 of each set, at least one image processing technique from among image transformation, skew correction, image cleaning, image filtering, and image segmentation, and outputs image-processed historical document images. As a result of the processing performed by the first image processor 130, sets of the image-processed historical document images that correspond to different document classes are obtained and output, in parallel, at least partially in parallel, or sequentially.

As an example, the description below focuses on the processing of one set of the historical document images 111, where all the historical document images correspond to the same document class. However, one skilled in the relevant art would understand that each set of the historical document images 111 that corresponds to the particular document class is processed similarly.

The data generation subsystem 102 may further include a first OCR engine 132. The first OCR engine 132 performs OCR on each document class of the image-processed historical document images, e.g., on each set of the image-processed historical document images, to extract text. The first OCR engine 132 then outputs a plurality of text streams each including text and corresponding to a certain document class. For example, the first OCR engine 132 performs processing on each set of the historical document images 111, which are image-processed, in parallel, at least partially in parallel, or sequentially.

In certain implementations, the data generation subsystem 102 includes a first filter 134. The first filter 134 receives the text streams and cleans, e.g., filters, the text extracted by the first OCR engine 132, based on rules 136. For example, the filtering performed by the first filter 134 may involve several filtering operations performed based on the rules 136. Exemplary filtering operations performed by the first filter 134 may include:

- removing special characters, where the rules 136 may have a rule that specifies the special characters, e.g., @, !, #, etc.
- removing stop words, where the rules 136 may have a rule that specifies a word as a stop word, e.g., "and," "was,", "is," etc.

However, the described-above is not intended to be limiting, and the first filter 134 may perform different or additional filtering operations.

As a result of the processing performed by the first image processor 130, the first OCR engine 132, and the first filter 134, the filtered text streams by a document class are generated and available for the generation of the dictionary 112 by a dictionary generator 140. As described above, each text stream corresponds to a certain document class, so that the filtered text streams are distinguished from each other by the document.

(b) Topic Modelling Using N-Grams

I. Dictionary

The dictionary generator 140 receives the filtered text streams from the first filter 134 and performs processing on the text streams, to generate the corpus, e.g., the dictionary 112 of most frequently occurring text units within each document class. The text unit may include one word or a sequence of sequential words present in the text of the text stream. The dictionary generator 140 performs processing on each of the text streams in parallel, at least partially in parallel, or sequentially.

In some embodiments, the dictionary generator 140 receives a text stream, extracts the text from the text stream, and generates N-gram groups by grouping or combining neighboring words of the text into text units, as described in detail below.

In an example, the text stream corresponds to the document class "invoice" and includes words extracted by the first OCR engine 132 from a number of the historical documents images corresponding to invoices. As described above, this number may be arbitrarily set by a user, and, in an example, may be 20.

Based on the text extracted by the first OCR engine 132 from one historical document image corresponding to the invoice, the dictionary generator 140 may receive a text stream including:

Invoice Number
Client Name
Your Company Name
Address

Based on the words of the text stream, the dictionary generator 140 may form N-gram groups, where N is a number from 1 to 4. Thus, the dictionary generator 140 may form a unigram group, a bigram group, a trigram group, and a quadram group. However, this is not limiting and the maximum number of N-gram groups may be different from 4, e.g., 2, 3, 5, etc.

For example, the text units including one word are assigned to (e.g., associated with) unigrams. The text units associated with unigrams may be "invoice," "number," "client," "name," "company," etc. The unigrams may form a unigram group for each corresponding text stream.

The text units including two sequential words are associated with bigrams. The text units associated with bigrams may be a sequence including "invoice number," etc. The bigrams may form a bigram group for each corresponding text stream.

The text units including three sequential words are associated with trigrams. The text units associated with trigrams may be a sequence including "your company name," etc. The trigrams may form a trigram group for each corresponding text stream.

In the same manner, the text units including four or more sequential words are associated with quadrams, and may form a quadram group for each corresponding text stream.

In certain implementations, the dictionary generator 140 arranges, for each text stream (i.e., text of each document class), the text units of each of the N-gram groups in a descending frequency order, as an ordered group of the text units of a corresponding N-gram group. Then, the dictionary generator 140 selects a first number of the text units having a greatest frequency within each ordered group of the text units of each of the N-gram groups, where the first number is equal to a first predetermined threshold number set by a user. In a non-limiting example, the first predetermined threshold number is 20. Accordingly, the dictionary generator 140 selects, as the base words for the dictionary 112, 20 text units occurring with the greatest frequency in each of the N-gram groups of a corresponding text stream or a corresponding document class. E.g., the number of the selected text units for each N-gram group of each document class is 20. As described above, the term "base word" corresponds to the "text unit" and may include one word or a sequence of sequential words extracted from the text.

In some embodiments, a user may set a rule by which the dictionary generator 140 is allowed to select only those text units in a corresponding N-gram group, as the base words, that occur with a frequency greater than a predetermined threshold frequency set by a user, to eliminate all the text units that are less frequently occurring. As an example, the unigram group may have 40 one-word text units, while quadram group may have five four-word text units which each appeared once in all the historical documents corresponding to the same document class. In this case, the text units of quadram group may be excluded from the inclusion to the dictionary 112. However, this is not limiting and a user may set a rule by which all of the text units in a corresponding N-gram group are included as the base words, if the number of the text units associated with that N-gram group is smaller than the first predetermined threshold number.

The dictionary generator 140 performs the above-described processing for each text stream (i.e., each document class), and outputs a first class dataset 142, a second class dataset 144, and a third class dataset 146 to an Mth class dataset 148 that each respectively includes the base words, e.g., the words and/or sequence of words that occur most often in the historical document images 111 corresponding to each of a first document class, a second document class, and a third document class to an Mth document class. E.g., each of the first to the Mth class datasets 142 to 148 includes a collection of the base words that are unigrams occurring with the greatest frequency in a text stream corresponding to a certain document class, the base words that are bigrams occurring with the greatest frequency in the text stream corresponding to the certain document class, the base words that are trigrams occurring with the greatest frequency in the text stream corresponding to the certain document class, and the base words that are quadrams occurring with the greatest frequency in the text stream corresponding to the certain document class.

In certain embodiments, the dictionary generator 140 may store the first to the Mth class datasets 142 to 148 in the storage subsystem 120. The first to the Mth class datasets 142 to 148 may be used in the generation of the trie structure 114, as described below. In some embodiments, the first to the Mth class datasets 142 to 148 may also be used in the processing performed by the document class determining subsystem 104 at the classification phase.

2. Trie Structure

Embodiments use the trie structure where the corpus of the generated dictionary is represented. As described in detail below, the trie structure is parsed to find the frequency of occurrence of a particular keyword of the input document image with respect to each document class, e.g., to find a similarity between the input document images and each document class. The closest match is then considered to be a document class of the input document image.

The related art techniques use a linear search of the corpus that is inefficient and resource-consuming technique. The novel trie structure allows for a search that is non-linear. The trie structure is a prefix trie and represents the entire corpus of the dictionary 112 for all the document classes, where the leaf nodes of the trie structure store keys corresponding to the base words occurring with the greatest frequency within each document class, e.g., in each of the first to the Mth class datasets 142 to 148. Further, each of the leaf nodes contains document class information indicating the occurrence of the associated keys in one or more document classes.

With continuing reference to FIG. 1A, the feature extractor 150 is configured to obtain the first to the Mth class datasets 142 to 148 from the dictionary generator 140, from the storage subsystem 120, or from an external device. The feature extractor 150 extracts the features of each document class from each of the first to the Mth class datasets 142 to 148.

In certain embodiments, the feature extractor 150 is configured to arrange the base words in each of the first to the Mth class datasets 142 to 148 in a descending frequency order, as an ordered group of the base words of each of the first to the Mth class datasets 142 to 148, e.g., the ordered group of the base words per document class corresponding to each of the first to the Mth class datasets 142 to 148. The feature extractor 150 may select a second number of the base words having a greatest frequency within each ordered group of the base words of the first to the Mth class datasets 142 to 148, where the second number is equal to a second predetermined threshold number set by a user. In a non-limiting example, the second predetermined threshold number is 20. Accordingly, the feature extractor 150 selects 20 base words occurring with the greatest frequency in each of the first to the Mth class datasets 142 to 148, and forms a feature group of the most often occurring base words across all document classes, where the base words included in the feature group represent all of the document classes. The feature extractor 150 then may output the feature group for the generation of the trie structure 114 by the trie generator 152.

Figure 4:
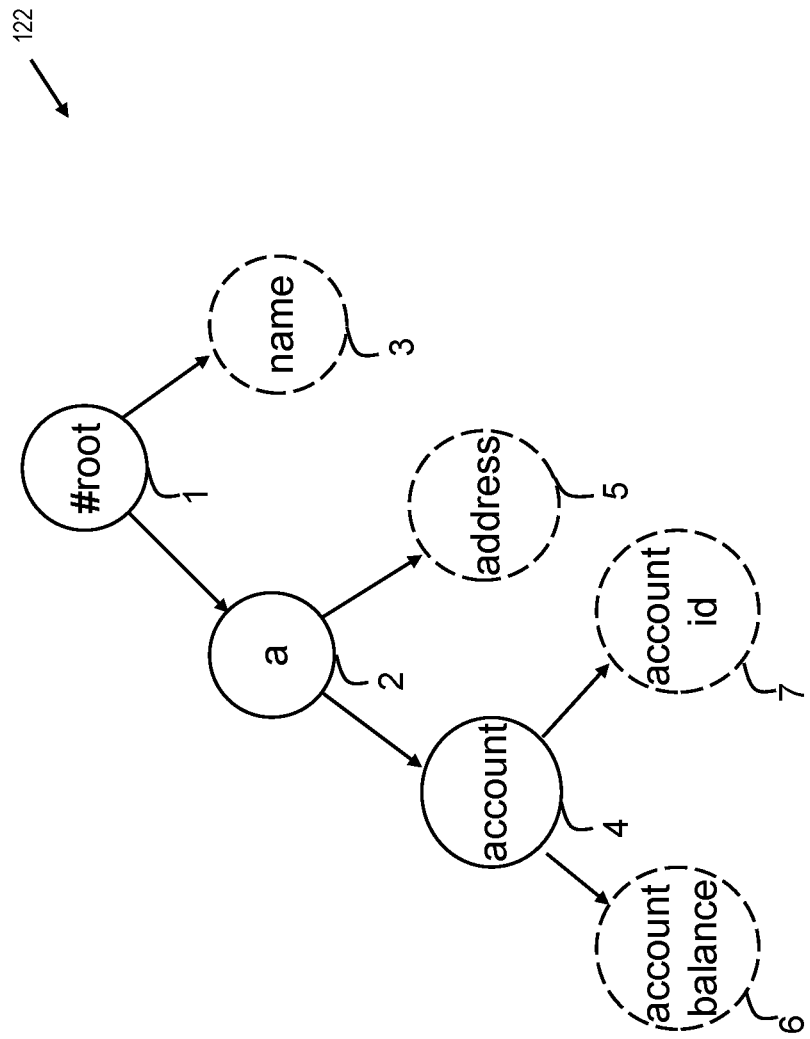
FIG. 4 depicts a trie structure according to various embodiments.
Figure 5:
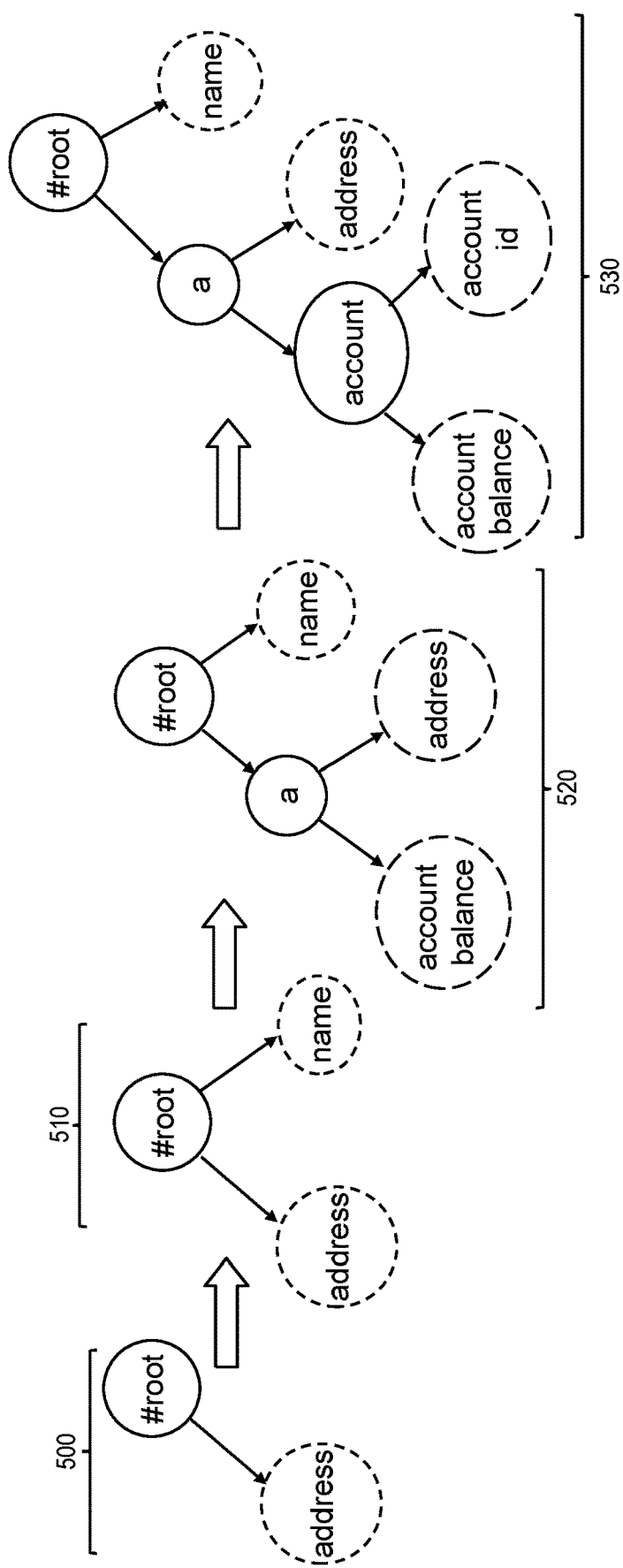
FIG. 5 illustrates processing by which the trie structure is constructed, according to various embodiments.

FIG. 4 depicts a trie structure according to various embodiments. FIG. 5 illustrates processing by which the trie structure is constructed, according to various embodiments.

With reference to FIGS. 4 and 5, the trie generator 152 generates the trie structure 114 to allow for faster searching, based on the base words included in the feature group. For simplicity of description, in an example of FIGS. 4 and 5, it is assumed that the feature group includes four base words—"address," "name," "account balance," and "account id." Accordingly, the trie structure is a keyword dictionary allowing for an easy and quick key retrieval.

With reference to FIGS. 4 and 5, the trie structure 114 contains internal nodes that are shown in solid line and designated by reference numerals 1, 2, and 4, and leaf nodes that are shown in breaking line and designated by reference numerals 3, 5, 6, and 7. The generation of the trie structure 114 starts with a root node 1 that is the internal node and a starting point from which the trie structure is parsed during the search. The internal nodes are not associated with any keys and may store the prefix strings of their child nodes. The actual keys are stored in the leaf nodes, e.g., associated with the leaf nodes.

Continuing with reference to FIG. 5, the trie generator 152 stores address, name, account balance, and account id in the trie structure 114. In a partial trie structure 500, a child node is created and associated with an "address" as a key. In a partial trie structure 510, a child node is created and associated with a "name" as a key. At this point, both an address and a name are child nodes of a root node.

Next, the trie generator 152 is tasked with creating a node for "account balance." The trie generator 152 searches the partial trie structure 510, to determine whether any existing node starts with "a" or have a common prefix, e.g., "account." Since the root node already has a child node having a key "address" which starts with a letter "a," an internal node is inserted between the root node and the node "address," as shown in a partial trie structure 520. The node "a" becomes a child node of the root node, and the node "address" becomes a child node of the node "a." Another child node of the node "a" is created to be associated with "account balance."

Next, the trie generator 152 is tasked with creating a node for "account id." The trie generator 152 searches the partial trie structure 520, to determine whether any existing node has a common prefix, e.g., account. Since one of the nodes of the partial trie structure 520 is associated with the prefix account, e.g., "account balance," an internal node "account" is inserted between the node "a" and node "account balance," as shown in a partial trie structure 530. The node "account" becomes a child node of the node "a," and the node "account balance" becomes a child node of the node "account." Another child node of the node "account" is created to be associated with "account id."

As described above, FIG. 4 shows the trie structure 114 that is generated based on the example described above with reference to FIG. 5. Although the generation of the trie structure 114 is exemplarily described with respect to four keys, the trie structure 114 may be generated based on any number of keys, e.g., 10, 20, . . . 100, . . . 200, etc. The trie structure 114 may be used in the processing performed by the document class determining subsystem 104 at the classification phase.

Figure 6B:
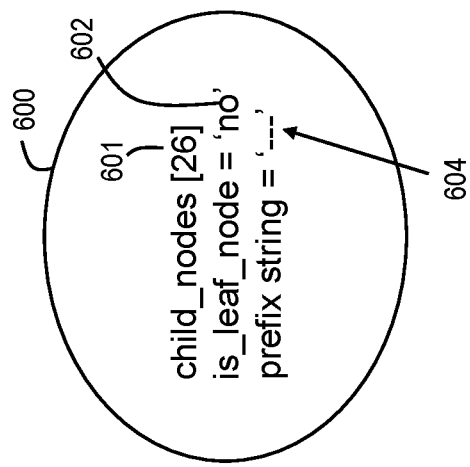
FIGS. 6A and 6B depict examples of an internal node according to various embodiments.
Figure 6A:
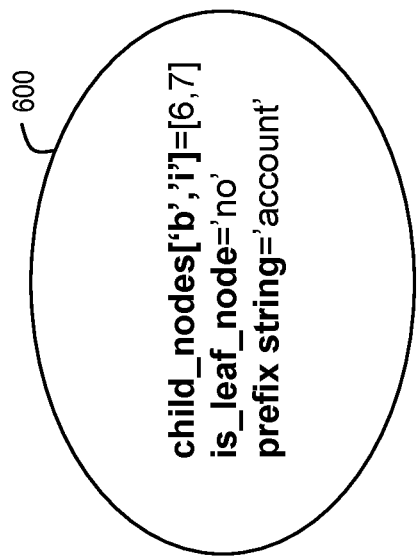

FIGS. 6A and 6B depict examples of an internal node 600 according to various embodiments.

The internal node can have 1 to 26 child nodes, e.g., for 26 letters of the alphabet. The internal node also has a marker or a flag 602 indicating that the node is not a leaf node. Further, each internal node may store its prefix in a field 604.

As exemplarily shown in FIG. 6B, the internal node has child nodes b and i. A field 604 indicates "account" as a prefix string of the internal node.

Figure 6C:
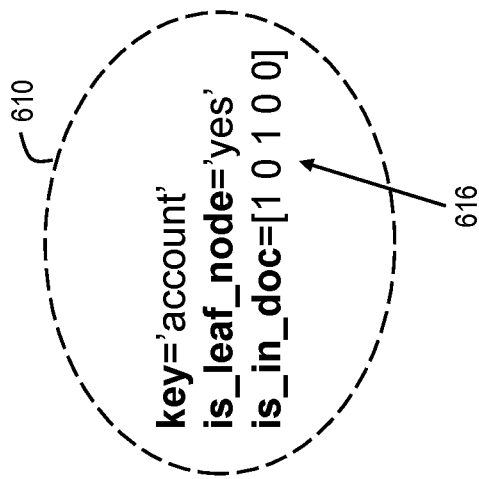
FIGS. 6C and 6D depict examples of a leaf node according to various embodiments.
Figure 6D:
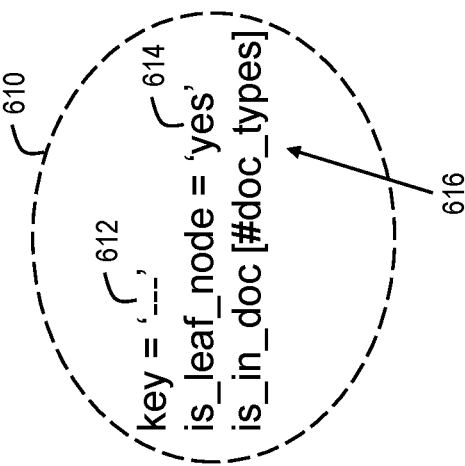

FIGS. 6C and 6D depict examples of a leaf node 610 according to various embodiments.

The leaf node stores its associated key in a field 612. Further, the leaf node has a marker or a flag 614 indicating that the node is a leaf node, and a field 616 indicating the document classes where a certain key occurs, e.g., the document class information.

As exemplarily shown in FIG. 6D, the field 612 contains the key "account." Assuming in a non-limiting example that a number of document classes is five, the field 616 contains a string of five digits "10100" that indicates that the key "account" occurs in the historical document images of the set corresponding to the first document class and in the historical document images of the set corresponding to the third document class, out of five document classes.

Figure 7A:
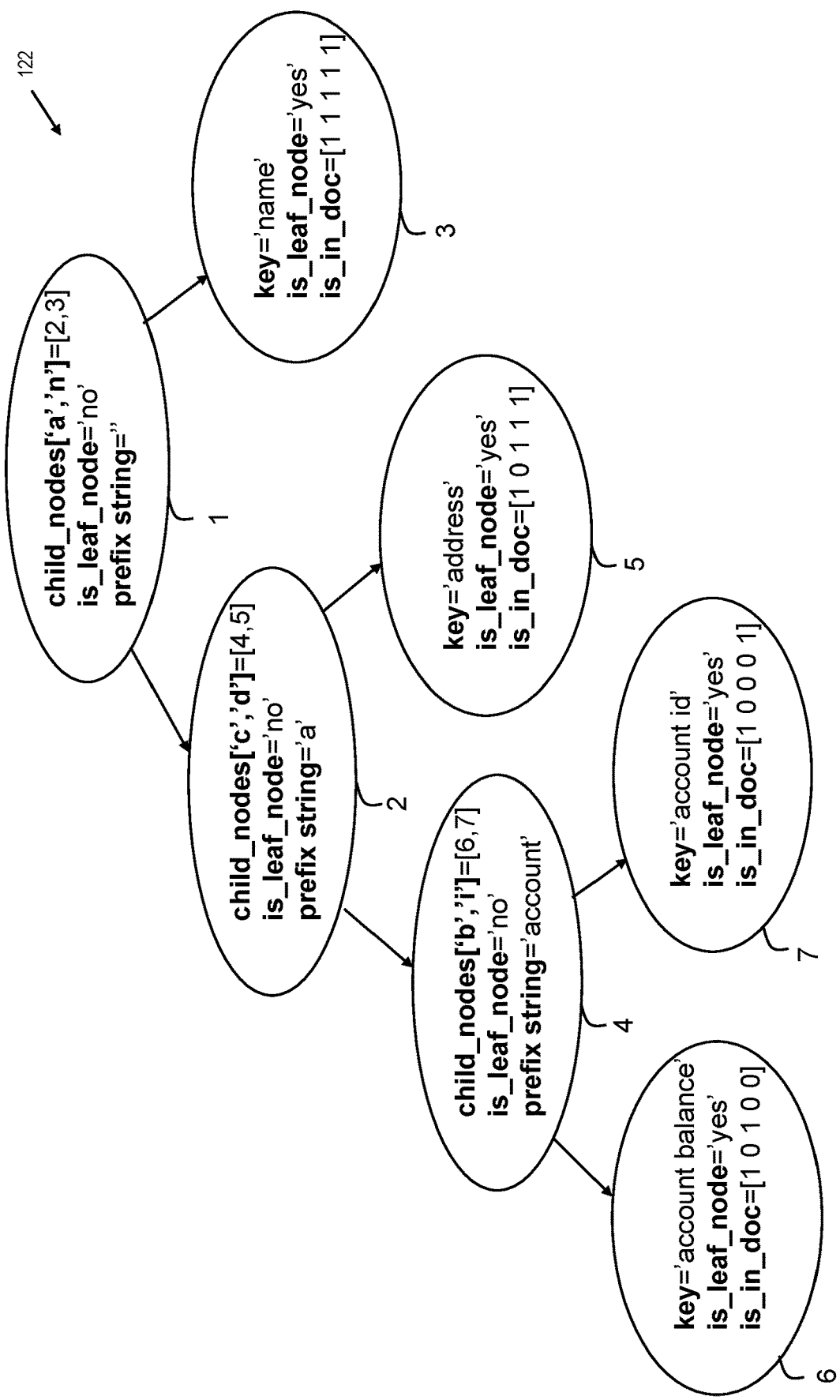
FIG. 7A depicts a trie structure according to various embodiments.

FIG. 7A depicts a trie structure according to various embodiments. The trie structure depicted in FIG. 7A may correspond to the trie structure of FIG. 4 where each of the nodes 1 to 7 is depicted with associated information.

As shown in FIG. 7A, a root node 1 has child nodes "a" and "n." For the child node "a," the root node is pointing to the node 2 having an associated prefix "a". For the child node n, the root node is pointing to the node 3 having an associated key "name." The node 2 has child nodes c and d. For the child node c, the node 2 is pointing to the node 4 having an associated prefix "account". I.e., a second letter of "account" is c. For the child node d, the node 2 is pointing to the node 5 having an associated key "address." I.e., a second letter of "address" is d. The node 4 has child nodes b and i. For the child node b, the node 4 is pointing to the node 6 having an associated key "account balance." I.e., a first letter of a second word in "account balance" is b. For the child node i, the node 4 is pointing to the node 7 having an associated key "account id." I.e., a first letter of a second word in "account id" is i.

Figure 7B:
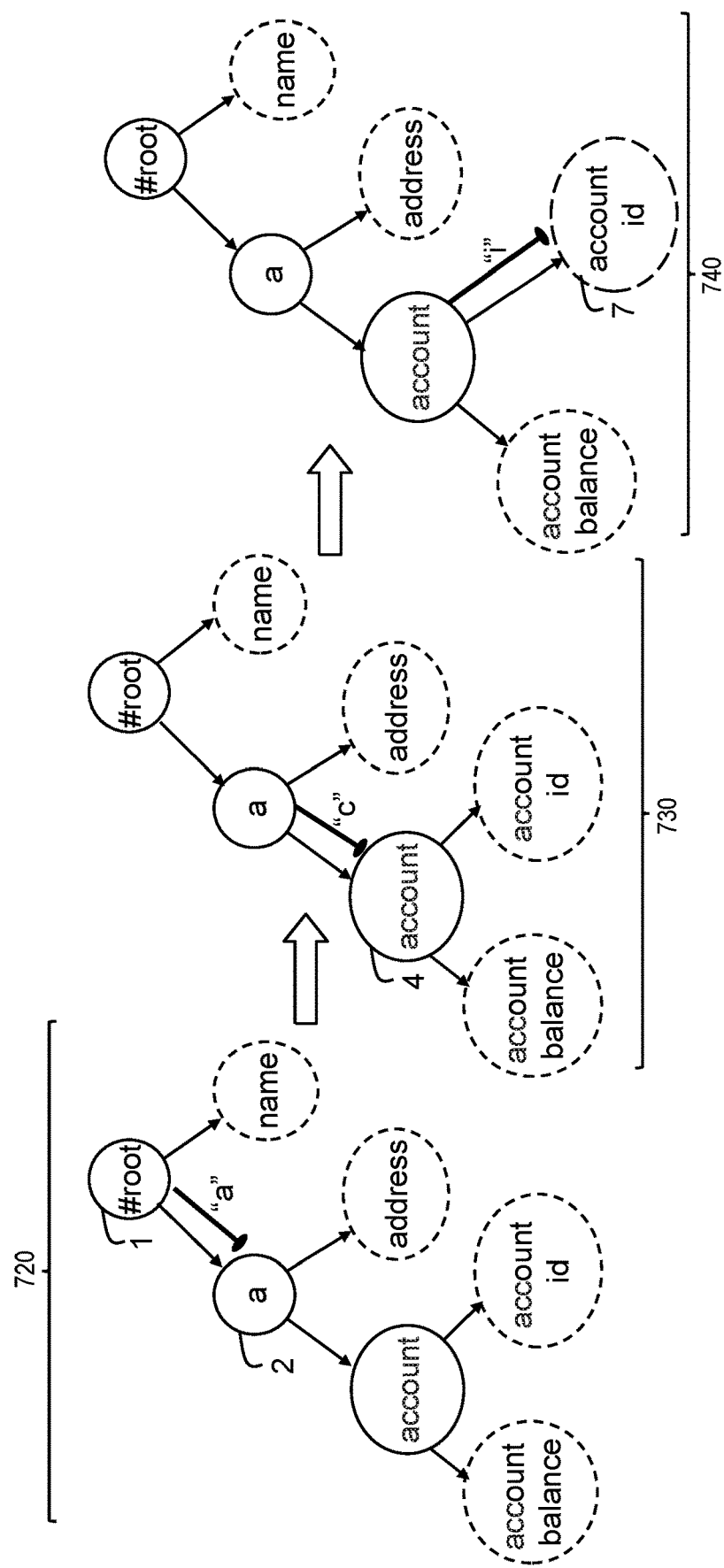
FIG. 7B depicts a search performed using a trie structure according to various embodiments.

FIG. 7B depicts an example of the searching using the trie structure 114 (e.g., parsing the trie structure 114) that is depicted in FIG. 7A according to various embodiments.

In an example, the trie structure 114 is searched for the key "account id." As shown by a reference numeral 720, the search starts at the root node that indicates that it has a child node designated by a letter "a" (node 2) and a child node designated by a letter "n" (node 3), as shown in FIG. 7A. Since "account id" starts with "a," the search proceeds to the child node of the root node that is designated by a letter "a" (node 2). As shown in FIG. 7A, the node "a" has a child node designated by a letter "c" (node 4) and a child node designated by a letter "d" (node 5). Since the second letter of "account" is c, the search proceeds to the child node of the node "a" that designated by a letter "c" (node 4), as shown by a reference numeral 730. The node 4 has a prefix "account" and indicates a child node designated by a letter "b" (node 6) and a child node designated by a letter "i" (node 7). Since the word "account" is found and a first letter of the second word "id" is "i," the search proceeds to the child node of the node "account" that designated by a letter "i" (node 7), as shown by a reference numeral 740. In this manner, the search proceeds in the alphabetical order as a search of a regular dictionary, e.g., Webster.

Figure 7C:
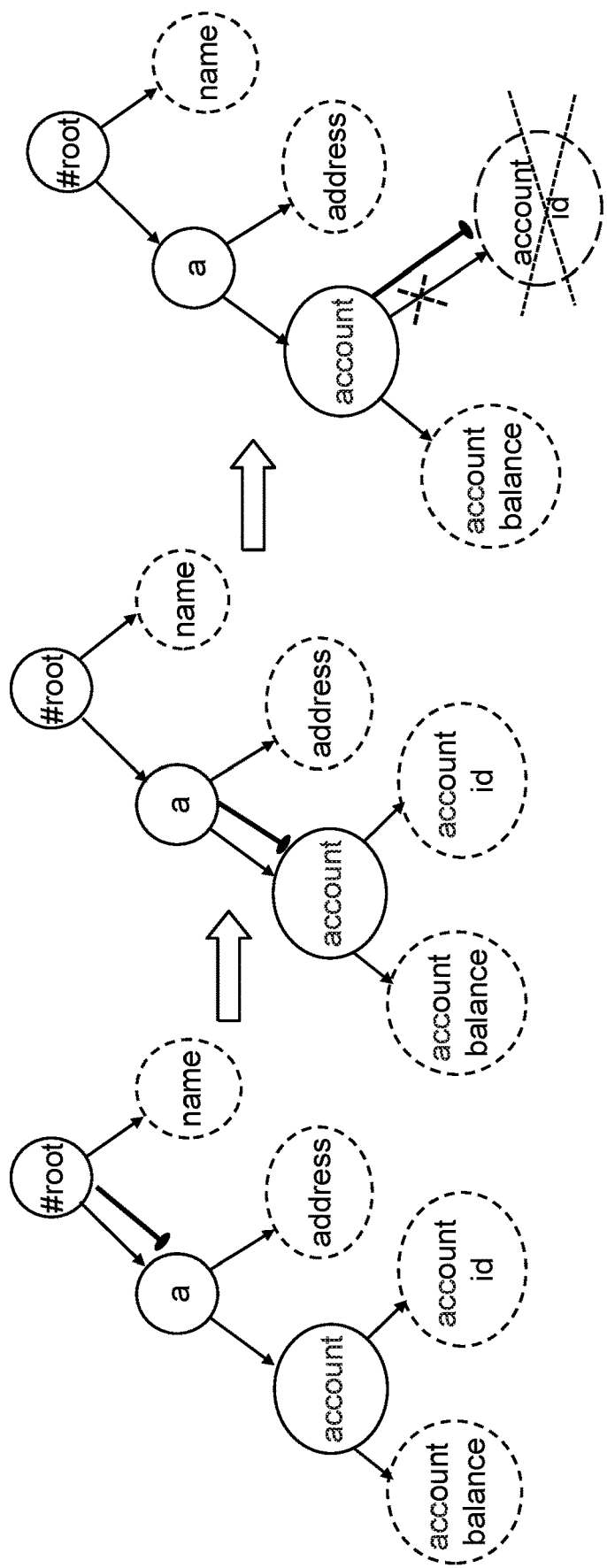
FIG. 7C depicts a processing by which a node is deleted from a trie structure according to various embodiments.

FIG. 7C depicts an example of a deletion of the node according to various embodiments.

With reference to FIG. 7C, the node to be deleted is the node having the key "account id." The search proceeds as described above with reference to FIG. 7B, to find the key "account id." Then, the link from the parent node is deleted, and the leaf node itself is deleted, as depicted in FIG. 7C.

With reference again to FIG. 7A, each of the nodes 3, 5, 6, and 7 (e.g., the leaf nodes) contains the field 616 described above with reference to FIGS. 6C and 6D. Continuing with the example of five document classes, the field 616 of each leaf node contains a five digit string indicating in which document class or document classes the corresponding key occurs. As described above, the keys in the leaf nodes correspond to the base words occurring with the greatest frequency in each of the first to the Mth class datasets 142 to 148, which in turn are generated in correspondence to the first to the Mth document classes, where M is equal 5, in an example of five document classes.

As shown in FIG. 7A, the node 3 contains a string "11111" that indicates that the key "name" corresponds to the base word occurring in each of five document classes. The node 5 contains a string "10111" that indicates that the key "address" corresponds to the base word occurring in the first document class and the third to the fifth document classes. The node 6 contains a string "10100" that indicates that the key "account balance" corresponds to the base words occurring in the first document class and the third document class. The node 7 contains a string "10001" that indicates that the key "account id" corresponds to the base words occurring in the first document class and the fifth document class.

The trie structure 114 generated by the trie generator 152 can be provided to document class determining subsystem 104 to classify an input document image, as described in detail below. In certain implementations, the trie structure 114 can also be stored in the storage subsystem 120.

II. Classification Phase

The document class determining subsystem 104 is configured to receive, as an input, data associated with the trie structure 114 and/or the dictionary 112 and classify an input document image into a certain document class.

(a) Keywords Extraction

In certain implementations, the document class determining subsystem 104 includes a second image processor 160. The second image processor 160 receives, as an input, the input document image. The second image processor 160 then performs processing on the input document image. For example, the second image processor 160 performs, on the input document image, at least one image processing technique from among image transformation, skew correction, image cleaning, image filtering, and image segmentation, and outputs image-processed input document image.

The document class determining subsystem 104 may further include a second OCR engine 162. The second OCR engine 162 performs OCR on image-processed input document image, to extract text. The second OCR engine 162 then outputs text extracted from the input document image, as an OCR result.

In certain implementations, the document class determining subsystem 104 includes a second filter 164. The second filter 164 receives the OCR result from the second OCR engine 162, and filters the OCR result corresponding to the image-processed input document image based on rules. The rules may be the rules 136 described above or may be different rules. For example, the filtering performed by the second filter 164 may involve several filtering operations performed based on the rules 136. Exemplary filtering operations performed by the second filter 164 may include:

- removing special characters, where the rules 136 may have a rule that specifies the special characters, e.g., @, !, #, etc.
- removing stop words, where the rules 136 may have a rule that specifies a word as a stop word, e.g., "and," "was,", "is," etc.

However, this is not intended to be limiting. In some embodiments, the second OCR engine 162 and the second filter 164 may be omitted. For example, the OCR on the image-processed input document image to extract text may be performed by the first OCR engine 132, and the filtering on the OCR result corresponding to the image-processed input document image may be performed by the first filter 134.

The document class determining subsystem 104 further includes a parser 166 that receives a filtered text of the input document images and parses the filtered text to obtain keywords. The keywords may include a single word or a sequence of sequential words. The document class determining subsystem 104 is configured to classify the input document image into a certain document class based on the keywords of the input document image and the trie structure 114 and/or the dictionary 112.

(b) Classification of Input Document Image

In certain implementations, the document class determining subsystem 104 may include a similarity comparator 170. The similarity comparator 170 is configured to receive, as an input, the keywords of the input document image, and classify the input document image into a certain document class using at least the data of the trie structure 114.

To classify the input document image into a certain document class using the data of the trie structure 114, the similarity comparator 170 may include a score calculator 172 that calculates a similarity score between the input document image and each document class.

I. Similarity Score

Figure 8:
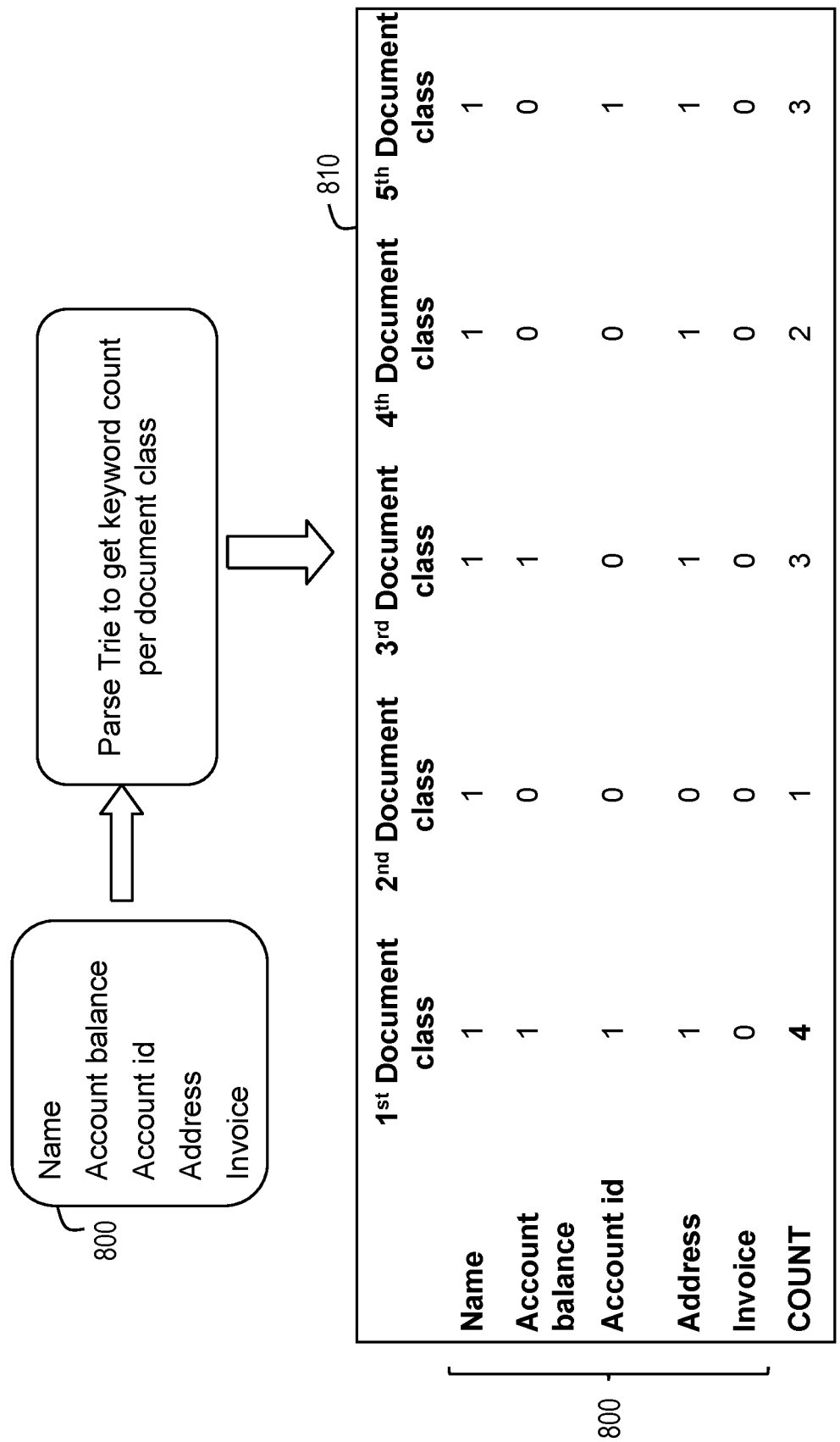
FIG. 8 depicts processing performed by the document categorization system according to various embodiments.

FIG. 8 depicts processing performed by the score calculator 172 according to various embodiments.

With reference to FIG. 8, the keywords 800 extracted from the input document image may be
Name
Account balance
Account id
Address
Invoice The score calculator 172 searches the trie structure 114 for each keyword, e.g., parses the trie structure 114 starting at the root node 1, as described above.

With reference again to FIG. 7A and continuing reference to FIG. 8, a table 810 shows the keywords 800 and the count values corresponding to the occurrence of each keyword by the document class in the trie structure 114. E.g., a count value of 1 indicates an occurrence of a keyword in a document class, and a count value of 0 indicates that a keyword does not occur in a document class.

In FIG. 7A, the node 3 contains the key "name" and indicates that the key "name" is present in each of five document classes. In a first row of the table 810 that corresponds to the keyword "name" of the input document image, a count of 1 is shown for each of five document classes.

The node 6 contains the key "account balance" and indicates that the key "account balance" is present in the first document class and the third document class. In a second row of the table 810 that corresponds to the keyword "account balance" of the input document image, a count of 1 is shown for the first and the third document classes, and a count of 0 is shown for the remaining document classes.

The node 7 contains the key "account id" and indicates that the key "account id" is present in the first document class and the fifth document class. In a third row of the table 810 that corresponds to the keyword "account id" of the input document image, a count of 1 is shown for the first and the fifth document classes, and a count of 0 is shown for the remaining document classes.

The node 5 contains the key "address" and indicates that the key "address" is present in each of the first document class and the third to the fifth document classes. In a fourth row of the table 810 that corresponds to the keyword "address" of the input document image, a count of 1 is shown for the first document class and the third to the fifth document classes, and a count of 0 is shown for the second document class.

The trie structure 114 of FIG. 7A does not contain a key "invoice," and, thus, in a fifth row of the table 810 that corresponds to the keyword "invoice" of the input document image, a count of 0 is shown for all five document classes.

The score calculator 172 then sums all count values by a document class, as shown in the table 810, and calculates a total count value by the document class, e.g., a number of times each keyword extracted from the input document image occurs in a corresponding document class. The total count value is a similarity score that represents a similarity between the text of the input document image and the text corresponding to each document class, e.g., a similarity between the keywords of the input document image and the keys corresponding to each document class.

The similarity comparator 170 is configured to determine a greatest total count value for the keywords of the input document image among the count values by the document class that are calculated by the score calculator 172, e.g., the first document class has a greatest total count value of 4. The greatest total count value indicates a document class where the greatest number of the keys matches the keywords of the input document image, e.g., indicates the closest match of the input document image to a certain document class. Thus, the similarity comparator 170 determines a document class having the greatest total count value to be the document class of the input document image, e.g., the first document class. The similarity comparator 170 may then assign the determined document class to the input document image and output the determined document class.

Figure 9:
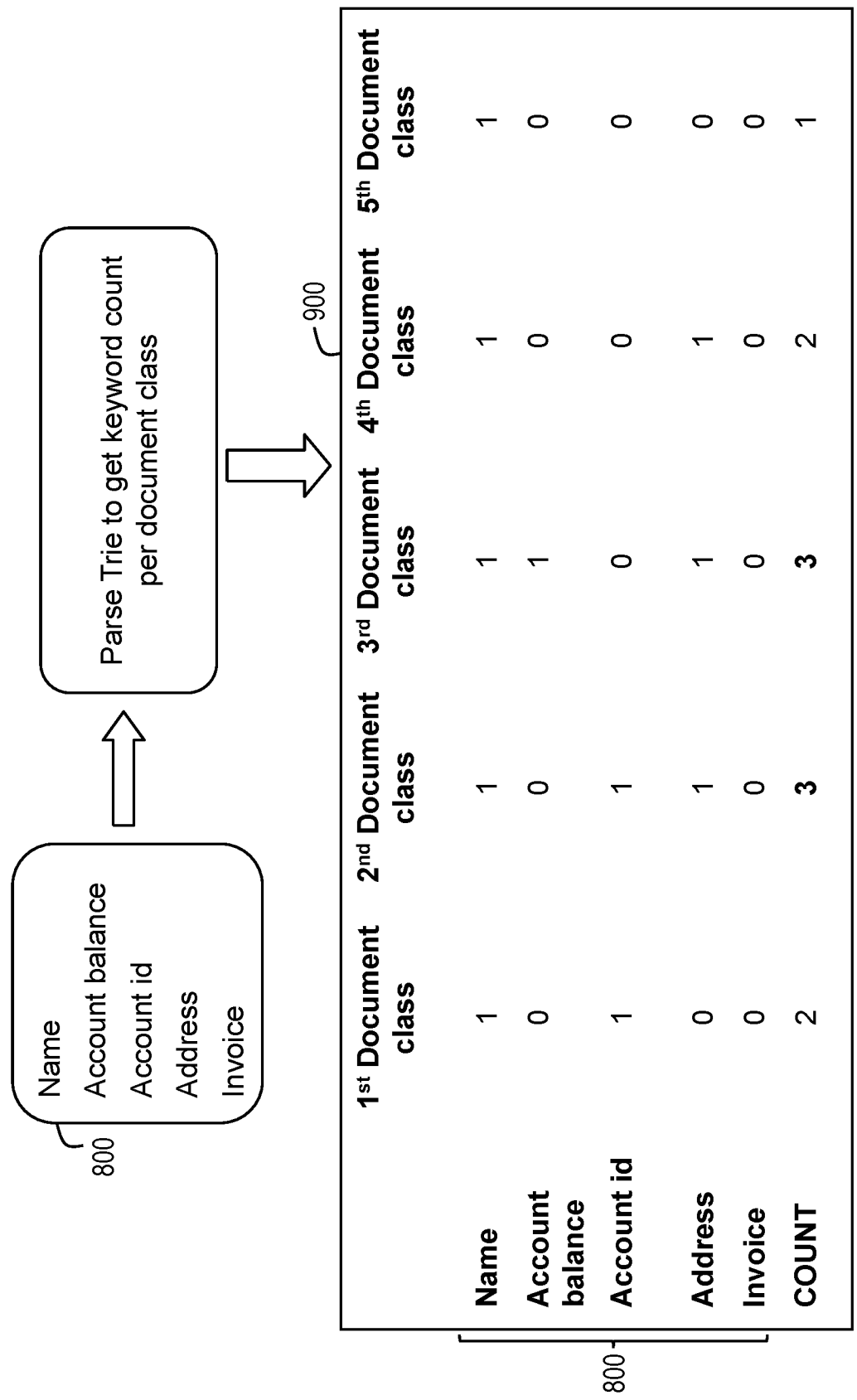
FIG. 9 depicts processing performed by the document categorization system according to various embodiments.

In some embodiments, the similarity comparator 170 might not be capable of determining a greatest total count value for the keywords of the input document image among the count values by the document class that are calculated by the score calculator 172, as in an example shown in FIG. 9.

FIG. 9 depicts processing performed by the score calculator 172 according to various embodiments.

In FIG. 9, a table 900 is based on the trie structure different from that depicted in FIG. 7A. Accordingly, in the table 900, the keywords 800 have different count values from the count values of the table 810. As a result of a summation performed by the score calculator 172, the similarity comparator 170 determines two document classes having an equal greatest total count value—the second document class and the third document class, e.g., a count value of 3.

In certain implementations, the similarity comparator 170 can further include a tie breaker 174. The tie breaker 174 is configured to break a tie between tie-scored document classes by taking into consideration the keyword frequency by referring to each N-gram group of tie-scored document classes, e.g., considering the frequency of the base words corresponding to the keywords that are stored in the second class dataset 144 and the third class dataset 146.

2. Tie Breaking

FIG. 10 depicts processing performed by the tie breaker 174 according to various embodiments.

As described above, each of the first to the Mth class datasets 142 to 148 includes a collection of the base words that are unigrams occurring with the greatest frequency in a text stream corresponding to a certain document class, the base words that are bigrams occurring with the greatest frequency in the text stream corresponding to the certain document class, the base words that are trigrams occurring with the greatest frequency in the text stream corresponding to the certain document class, and the base words that are quadrams occurring with the greatest frequency in the text stream corresponding to the certain document class.

In an example of generating the dictionary 112 that is described above, 20 historical document images are used per document class. Thus, the data of each of the second class dataset 144 and the third class dataset 146 represent 20 document images of the second document class and 20 document images of the third document class, respectively.

The tie breaker 176 obtains a keyword frequency for each of the keywords of the input document image using the base words of the second class dataset 144 and the third class dataset 146, and calculates a corresponding weight for each of the keywords, with respect to each of the second class dataset 144 and the third class dataset 146.

In a non-limiting example depicted in the table 1000 of FIG. 10, the base word corresponding to a first keyword "name" occurs 20 times in the second class dataset 144, e.g., a frequency count of the first keyword "name" with respect to the first document class is 20. The tie breaker 176 then calculates a keyword weight of 1 for the first keyword "name" with respect to the second document class, by using the following equation 1:

$$\text{Weight} = \text{Keyword Frequency/Total number of documents} = 20/20 = 1$$

Further, as depicted in the table 1000 of FIG. 10, the base word corresponding to the first keyword "name" occurs 40 times in the third class dataset 146, e.g., a frequency count of the first keyword "name" with respect to the third document class is 40. The tie breaker 176 calculates a keyword weight of 2 (40/20) for the first keyword "name" with respect to the third document class.

Likewise, the tie breaker 176 calculates a keyword weight for each of the remaining keywords, with respect to each of the second class dataset 144 and the third class dataset 146. Then, the tie breaker 176 calculates a product weight for each keyword, with respect to each of the second document class and the third document class, as a product of the keyword weights determined for the keywords corresponding to each of the second document class and the third document class:

$$\text{Product weight\_second document class} = 1*0.9*0.75*0.9*0.6 = 0.365$$

$$\text{Product weight\_third document class} = 2*0.5*0.9*0.6*0.95 = 0.513$$

The similarity comparator 170 then determines a document class having the greatest product weight to be the document class of the input document image, e.g., the third document class. The similarity comparator 170 assigns the determined document class to the input document image and outputs the determined document class.

Methods

Figure 2A:
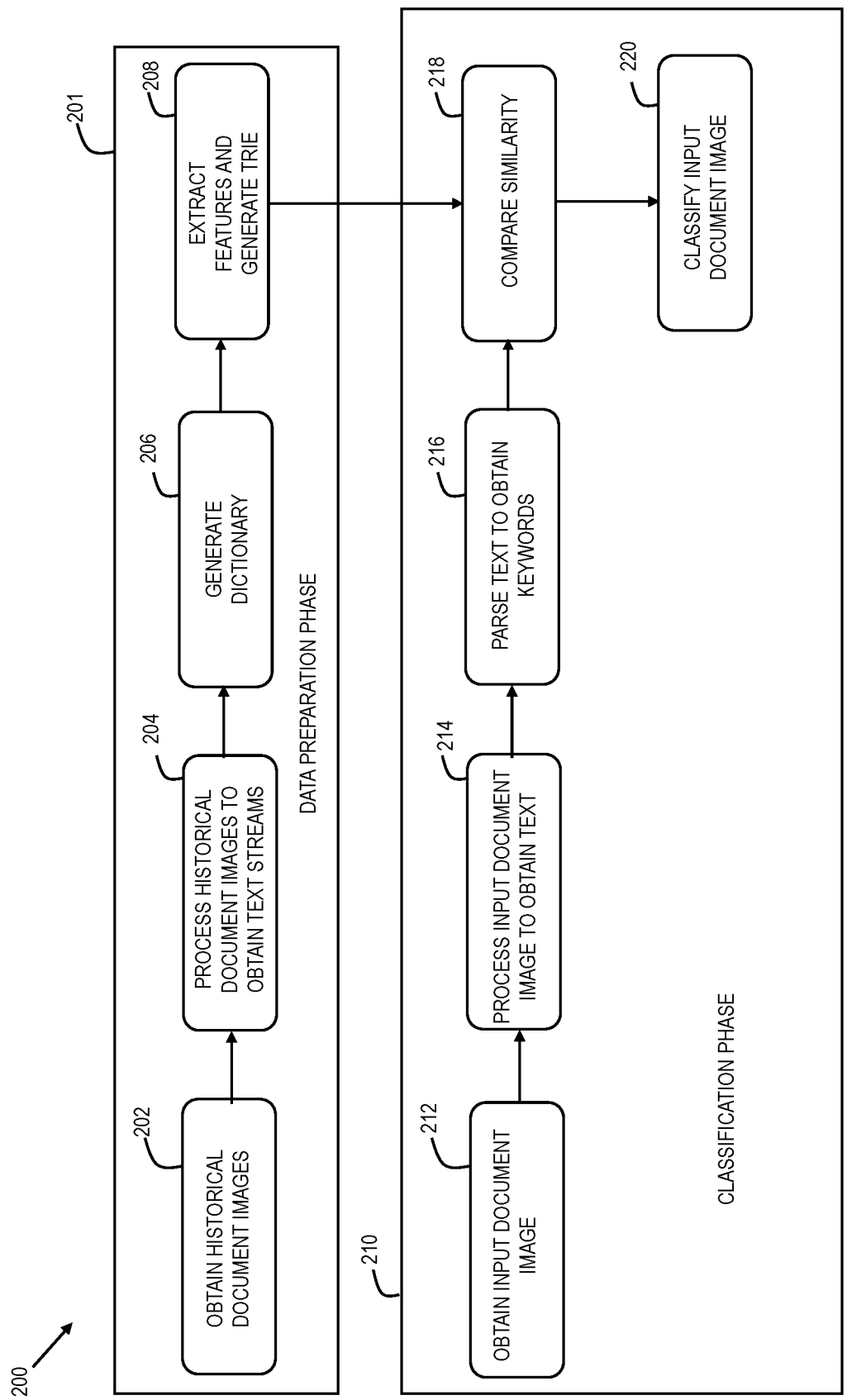
FIG. 2A is a flowchart of a method according to various embodiments.

FIG. 2A is a flowchart of a method 200 performed by the document categorization system 100 according to various embodiments. For example, the method 200 depicted in FIG. 2A may be performed by at least one of the data generation subsystem 102 and the document class determining subsystem 104.

The method 200 depicted in FIG. 2A may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 2A and described below is intended to be illustrative and non-limiting. Although FIG. 2A depicts the various processing operations occurring in a particular sequence or order, this is not intended to be limiting. In certain alternative embodiments, the method 200 may be performed in some different order or some operations may be performed in parallel.

During a data preparation phase 201, the document categorization system 100 obtains the historical document images 111 (operation 202).

At 204, the document categorization system 100 processes the historical document images 111, to obtain text streams.

At 206, the document categorization system 100 generates the dictionary 112 including the first to the Mth class datasets 142 to 148.

At 208, the document categorization system 100 extracts the features of each document class from the first to the Mth class datasets 142 to 148, e.g., the base words that most often in each the first to the Mth class datasets 142 to 148, and generates the trie structure 114 containing keys corresponding to the base words that most often occur within each of the first to the Mth class datasets 142 to 148.

During a classification phase 210, the document categorization system 100 obtains an input document image (operation 212).

At 214, the document categorization system 100 processes the input document image to obtain text.

At 216, the document categorization system 100 parses text to obtain keywords.

At 218, the document categorization system 100 compares the similarity between input document image and the first to the Mth document classes.

At 220, the document categorization system 100 classifies the input document image into a certain document class.

FIG. 2B is a flowchart of a method 221 performed by the document categorization system 100 according to various embodiments. For example, the method 221 depicted in FIG. 2B may correspond to the operation 204 described above with reference to FIG. 2A, and may be performed by all or some of the first image processor 130, the first OCR engine 132, and the first filter 134.

The method 221 depicted in FIG. 2B may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 2B and described below is intended to be illustrative and non-limiting. Although FIG. 2B depicts the various processing operations occurring in a particular sequence or order, this is not intended to be limiting. In certain alternative embodiments, the method 221 may be performed in some different order or some operations may be performed in parallel.

At 222, the first image processor 130 performs image processing on the historical document images 111. The image processing performed on the historical document images 111 includes at least one image processing technique from among image transformation, skew correction, image cleaning, image filtering, and image segmentation.

At 224, the first OCR engine 132 performs OCR on the historical document images 111 that are image-processed, to obtain text streams.

At 226, the first filter 134 applies filtering on the text streams, to clean and normalize the text of the text streams corresponding to document classes of the historical document images 111.

At 228, the processed text corresponding to the historical document images 111 is output.

Figure 2C:
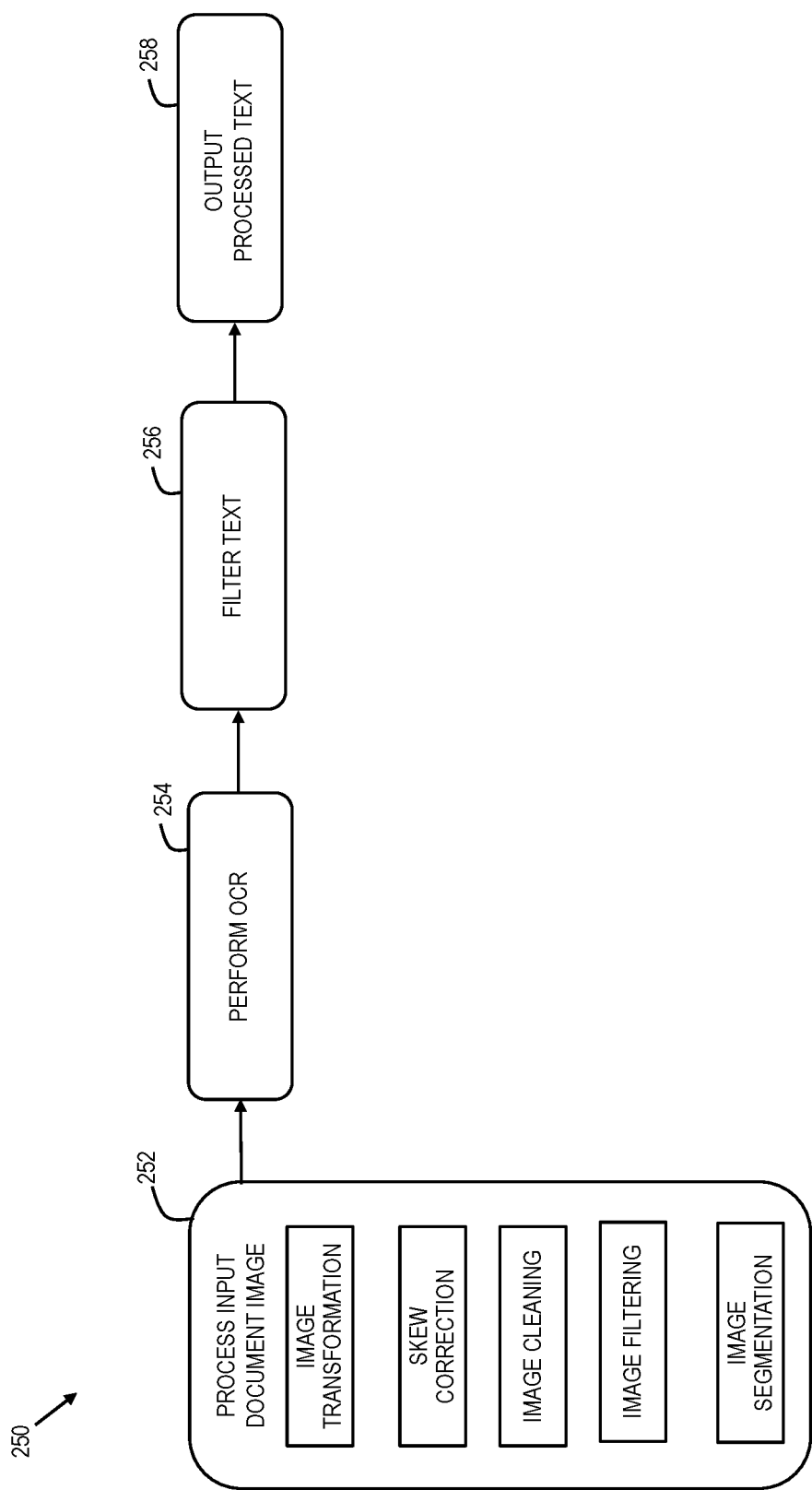
FIG. 2C is a flowchart of a method according to various embodiments.

FIG. 2C is a flowchart of a method 250 performed by the document categorization system 100 according to various embodiments. For example, the method 250 depicted in FIG. 2C may correspond to the operation 214 described above with reference to FIG. 2A, and may be performed by all or some of the second image processor 160, the second OCR engine 162, and the second filter 164. As described above, in some embodiments, the second OCR engine 162 and the second filter 164 may be omitted. In such embodiments, the operations described herein may be respectively performed by the first OCR engine 132 and the first filter 134.

The method 250 depicted in FIG. 2C may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 2C and described below is intended to be illustrative and non-limiting. Although FIG. 2C depicts the various processing operations occurring in a particular sequence or order, this is not intended to be limiting. In certain alternative embodiments, the method 250 may be performed in some different order or some operations may be performed in parallel.

At 252, the second image processor 160 performs image processing on the input document image. The image processing performed on the input document image includes at least one image processing technique from among image transformation, skew correction, image cleaning, image filtering, and image segmentation.

At 254, the second OCR engine 162 performs OCR on the image-processed input document image, to obtain text.

At 256, the second filter 164 applies filtering on the text of the input document image, to clean and normalize the text.

At 258, the processed text corresponding to the input document image is output.

FIG. 2D is a flowchart of a method 260 performed by the document categorization system 100 according to various embodiments. For example, the method 260 depicted in FIG. 2D may correspond to the operations 218 and 220 described above with reference to FIG. 2A, and may be performed by the similarity comparator 170.

The method 260 depicted in FIG. 2D may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 2D and described below is intended to be illustrative and non-limiting. Although FIG. 2D depicts the various processing operations occurring in a particular sequence or order, this is not intended to be limiting. In certain alternative embodiments, the method 260 may be performed in some different order or some operations may be performed in parallel.

At 264, the similarity comparator 170 may compare the similarity between the keywords of the input document image and the features of the first to the Mth document classes. As described above, in certain implementations, the features of the first to the Mth document classes may be obtained by parsing the trie structure 114 using the keywords of the input document image, and obtaining the keys and associated information that are stored at the leaf nodes. In some embodiments, the features of the first to the Mth document classes may be obtained from the first to the Mth class datasets 142 to 148, respectively, of the dictionary 112.

At 268, the similarity comparator 170 determines, based on the obtained features, the closest match of the keywords of the input document image to one of the document classes and assigns that document class to the input document image.

FIG. 3A is a flowchart of a method 300 performed by the document categorization system 100 according to various embodiments.

For example, the method 300 depicted in FIG. 3A may correspond to the operations 202 to 208 described above with reference to FIG. 2A, and may be performed by the data generation subsystem 102.

The method 300 depicted in FIG. 3A may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 3A and described below is intended to be illustrative and non-limiting. Although FIG. 3A depicts the various processing operations occurring in a particular sequence or order, this is not intended to be limiting. In certain alternative embodiments, the method 300 may be performed in some different order or some operations may be performed in parallel.

At 302, the data generation subsystem 102 obtains a plurality of historical document images 111 including text, the plurality of historical document images corresponding to a plurality of document classes different from each other.

In certain implementations, the data generation subsystem 102 extracts the text from the plurality of historical document images, by performing an image processing on the plurality of historical document images, respectively, the image processing including at least one from among image transformation, skew correction, image cleaning, image filtering, and image segmentation, obtaining a text stream, by performing an optical character recognition (OCR) on the image-processed plurality of historical document images, and filtering the text stream. The text stream is one of a plurality of text streams, where each of the plurality of text streams is obtained from historical document images belonging a same document class, among the plurality of historical document images, and filtered.

At 304, the data generation subsystem 102 generates a dictionary using the text of the plurality of historical document images, the dictionary including base words occurring with a greatest frequency in each of the plurality of document classes. The base words are extracted from the text of the plurality of historical document images and arranged in datasets by a document class, and each of the datasets includes the base words of a same document class that occur with the greatest frequency within that document class.

In detail, the data generation subsystem 102 processes each of the plurality of text streams by extracting, from a corresponding text stream, text units, each of the text units including one word or sequential words, and, for each corresponding text stream, forming N-gram groups, N being a number from 1 to 4. The text units including one word are associated with unigrams and form a unigram group, the text units including two sequential words are associated with bigrams and form a bigram group, the text units including three sequential words are associated with trigrams and form a trigram group, and the text units including four or more sequential words are associated with quadrams and may form a quadram group, among the N-gram groups.

The data generation subsystem 102 arranges the text units of each of the N-gram groups in a descending frequency order, as an ordered group of the text units of a corresponding N-gram group, selects a predetermined number of the text units having a greatest frequency within each ordered group of the text units of each of the N-gram groups, and generates the datasets by the document class, each of the datasets including the selected text units of each of the N-gram groups of the corresponding text stream as the base words of a corresponding document class.

At 304, the data generation subsystem 102 generates a trie structure using the base words of the datasets that occur with a greatest frequency in each of the datasets. The trie structure includes internal nodes including a root node, and leaf nodes in which keys corresponding to the base words occurring with the greatest frequency in each of the datasets are respectively stored in a predefined order, where the trie structure is searchable in the predefined order starting with the root node.

In certain implementations, the data generation subsystem 102 may arrange the base words in each of the datasets in a descending frequency order, as an ordered group of the base words of each of the datasets per document class, and select a predetermined number of the base words having the greatest frequency within each ordered group of the base words of the datasets, where the base words selected from the ordered group of the base words correspond to the keys. The data generation subsystem 102 can then store the keys in the alphabetical order in the leaf nodes. Each of the keys of the trie structure occurs in one or more document classes among the plurality of document classes, and each of the leaf nodes stores, for each of the keys, document class information indicating whether each of the keys occurs in the one or more document classes.

FIG. 3B is a flowchart of a method 310 performed by the document categorization system 100 according to various embodiments.

For example, the method 310 depicted in FIG. 3B may correspond to at least some of the operations 202 to 220 described above with reference to FIG. 2A, and may be performed by at least one from among the data generation subsystem 102 and the document class determining subsystem 104.

The method 310 depicted in FIG. 3B may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 3B and described below is intended to be illustrative and non-limiting. Although FIG. 3B depicts the various processing operations occurring in a particular sequence or order, this is not intended to be limiting. In certain alternative embodiments, the method 310 may be performed in some different order or some operations may be performed in parallel.

At 312, the document class determining subsystem 104 obtains datasets corresponding to a plurality of document classes different from each other. Each of the datasets includes base words that occur with a greatest frequency per each N-gram group within a same document class, where the base words are extracted from text of a plurality of historical document images.

At 314, the document class determining subsystem 104 obtains a trie structure 114 that includes the base words of the datasets that occur with a greatest frequency in each of the datasets. The trie structure 114 includes internal nodes including a root node and leaf nodes in which keys corresponding to the base words occurring with the greatest frequency in each of the datasets are respectively stored in an alphabetical order. Each of the keys of the trie structure occurs in one or more document classes among the plurality of document classes, and each of the leaf nodes stores, for each of the keys, document class information indicating whether each of the keys occurs in the one or more document classes.

At 316, the document class determining subsystem 104 obtains an input document image including text having keywords.

At 318, the document class determining subsystem 104 identifies keys of the trie structure that match the keywords of the input document image, by searching the trie structure in the alphabetical order using each of the keywords.

At 320, the document class determining subsystem 104 estimates a document class of the input document image based on the document class information associated with the identified keys, among the plurality of document classes.

In certain implementations, the document class determining subsystem 104 calculates a similarity score between the input document image and the plurality of document classes, respectively, by summing, for each of the plurality of document classes, a number of times each of the keywords occurs in a corresponding document class, based on the document class information associated with the identified keys, and obtains a plurality of similarity scores for the plurality of document classes, respectively. The document class determining subsystem 104 determines whether the plurality of similarity scores includes a greatest similarity score for one document class or multiple document classes, among the plurality of document classes.

In some embodiments, the document class determining subsystem 104 determines that the greatest similarity score corresponds to the one document class, and classifies the input document image into the one document class associated with the greatest similarity score.

In some embodiments, the document class determining subsystem 104 determines that the plurality of similarity scores includes the greatest similarity score corresponding to the multiple document classes, and then classifies the input document image based on a frequency of the base words that occur in each of the multiple document classes of the respective datasets.

For example, the document class determining subsystem 104 determines a keyword frequency for each of the keywords for each of the multiple document classes, the keyword frequency corresponding to a frequency with which the base words corresponding to the keywords occur in each of the multiple document classes, calculates a keyword weight for each of the keywords based on the keyword frequency and a total number of historical document images for each of the multiple document classes, among the plurality of historical document images, and obtains a plurality of keyword weights for the multiple document classes, respectively.

The document class determining subsystem 104 then calculates a product weight for each of the multiple document classes, based on the plurality of keyword weights calculated for each of the multiple document classes, and classifies the input document image into a document class associated with a greatest value of the product weight among the multiple document classes.

Illustrative Systems

FIG. 11 depicts a simplified diagram of a distributed system 1100. In the illustrated example, distributed system 1100 includes one or more client computing devices 1102, 1104, 1106, and 1108, coupled to a server 1112 via one or more communication networks 1110. Clients computing devices 1102, 1104, 1106, and 1108 may be configured to execute one or more applications.

In various examples, server 1112 may be adapted to run one or more services or software applications that enable one or more embodiments described in this disclosure. In certain examples, server 1112 may also provide other services or software applications that may include non-virtual and virtual environments. In some examples, these services may be offered as web-based or cloud services, such as under a Software as a Service (SaaS) model to the users of client computing devices 1102, 1104, 1106, and/or 1108. Users operating the client computing devices 1102, 1104, 1106, and/or 1108 may in turn utilize one or more client applications to interact with server 1112 to utilize the services provided by these components.

In the configuration depicted in FIG. 11, server 1112 may include one or more components 1118, 1120 and 1122 that implement the functions performed by server 1112. These components may include software components that may be executed by one or more processors, hardware components, or combinations thereof. It should be appreciated that various different system configurations are possible, which may be different from distributed system 1100. The example shown in FIG. 11 is thus one example of a distributed system for implementing an example system and is not intended to be limiting.

Users may use the client computing devices 1102, 1104, 1106, and/or 1108 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 11 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Communication network(s) 1110 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, communication network(s) 1110 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIXR servers, mid-range servers, mainframe computers, rack-mounted servers, etc.), server farms, server clusters, or any other appropriate arrangement and/or combination. Server 1112 may include one or more virtual machines running virtual operating systems, or other computing architectures involving virtualization such as one or more flexible pools of logical storage devices that may be virtualized to maintain virtual storage devices for the server. In various examples, server 1112 may be adapted to run one or more services or software applications that provide the functionality described in the foregoing disclosure.

The computing systems in server 1112 may run one or more operating systems including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more data repositories 1114, 1116. These data repositories may be used to store data and other information in certain examples. For example, one or more of the data repositories 1114, 1116 may be used to store information such as information related to chatbot performance or generated models for use by chatbots used by server 1112 when performing various functions in accordance with various embodiments. Data repositories 1114, 1116 may reside in a variety of locations. For example, a data repository used by server 1112 may be local to server 1112 or may be remote from server 1112 and in communication with server 1112 via a network-based or dedicated connection. Data repositories 1114, 1116 may be of different types. In certain examples, a data repository used by server 1112 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1114, 1116 may also be used by applications to store application data. The data repositories used by applications may be of different types such as, for example, a key-value store repository, an object store repository, or a general storage repository supported by a file system.

In certain examples, the functionalities described in this disclosure may be offered as services via a cloud environment. FIG. 12 is a simplified block diagram of a cloud-based system environment in which various services may be offered as cloud services in accordance with certain examples. In the example depicted in FIG. 12, cloud infrastructure system 1202 may provide one or more cloud services that may be requested by users using one or more client computing devices 1204, 1206, and 1208. Cloud infrastructure system 1202 may include one or more computers and/or servers that may include those described above for server 1112. The computers in cloud infrastructure system 1202 may be organized as general purpose computers, specialized server computers, server farms, server clusters, or any other appropriate arrangement and/or combination.

Network(s) 1210 may facilitate communication and exchange of data between client computing devices 1204, 1206, and 1208 and cloud infrastructure system 1202. Network(s) 1210 may include one or more networks. The networks may be of the same or different types. Network(s) 1210 may support one or more communication protocols, including wired and/or wireless protocols, for facilitating the communications.

The example depicted in FIG. 12 is only one example of a cloud infrastructure system and is not intended to be limiting. It should be appreciated that, in some other examples, cloud infrastructure system 1202 may have more or fewer components than those depicted in FIG. 12, may combine two or more components, or may have a different configuration or arrangement of components. For example, although FIG. 12 depicts three client computing devices, any number of client computing devices may be supported in alternative examples.

The term cloud service is generally used to refer to a service that is made available to users on demand and via a communication network such as the Internet by systems (e.g., cloud infrastructure system 1202) of a service provider. Typically, in a public cloud environment, servers and systems that make up the cloud service provider's system are different from the customer's own on-premises servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1202 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1202 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1202. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1202. Cloud infrastructure system 1202 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1202 may be configured to provide one or even multiple cloud services.

Cloud infrastructure system 1202 may provide the cloud services via different deployment models. In a public cloud model, cloud infrastructure system 1202 may be owned by a third party cloud services provider and the cloud services are offered to any general public customer, where the customer may be an individual or an enterprise. In certain other examples, under a private cloud model, cloud infrastructure system 1202 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1202 and the services provided may be shared by several organizations in a related community. Various other models such as hybrids of the above mentioned models may also be used.

Client computing devices 1204, 1206, and 1208 may be of different types (such as client computing devices 1102, 1104, 1106, and 1108 depicted in FIG. 11) and may be capable of operating one or more client applications. A user may use a client device to interact with cloud infrastructure system 1202, such as to request a service provided by cloud infrastructure system 1202. For example, a user may use a client device to request information or action from a chatbot as described in this disclosure.

In some examples, the processing performed by cloud infrastructure system 1202 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1202 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 12, cloud infrastructure system 1202 may include infrastructure resources 1230 that are utilized for facilitating the provision of various cloud services offered by cloud infrastructure system 1202. Infrastructure resources 1230 may include, for example, processing resources, storage or memory resources, networking resources, and the like. In certain examples, the storage virtual machines that are available for servicing storage requested from applications may be part of cloud infrastructure system 1202. In other examples, the storage virtual machines may be part of different systems.

In certain examples, to facilitate efficient provisioning of these resources for supporting the various cloud services provided by cloud infrastructure system 1202 for different customers, the resources may be bundled into sets of resources or resource modules (also referred to as "pods"). Each resource module or pod may include a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1202 may itself internally use services 1232 that are shared by different components of cloud infrastructure system 1202 and which facilitate the provisioning of services by cloud infrastructure system 1202. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 1202 may include multiple subsystems. These subsystems may be implemented in software, or hardware, or combinations thereof. As depicted in FIG. 12, the subsystems may include a user interface subsystem 1212 that enables users or customers of cloud infrastructure system 1202 to interact with cloud infrastructure system 1202. User interface subsystem 1212 may include various different interfaces such as a web interface 1214, an online store interface 1216 where cloud services provided by cloud infrastructure system 1202 are advertised and are purchasable by a consumer, and other interfaces 1218. For example, a customer may, using a client device, request (service request 1234) one or more services provided by cloud infrastructure system 1202 using one or more of interfaces 1214, 1216, and 1218. For example, a customer may access the online store, browse cloud services offered by cloud infrastructure system 1202, and place a subscription order for one or more services offered by cloud infrastructure system 1202 that the customer wishes to subscribe to. The service request may include information identifying the customer and one or more services that the customer desires to subscribe to. For example, a customer may place a subscription order for a service offered by cloud infrastructure system 1202. As part of the order, the customer may provide information identifying a chatbot system for which the service is to be provided and optionally one or more credentials for the chatbot system.

In certain examples, such as the example depicted in FIG. 12, cloud infrastructure system 1202 may include an order management subsystem (OMS) 1220 that is configured to process the new order. As part of this processing, OMS 1220 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1220 may then invoke the order provisioning subsystem (OPS) 1224 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1224 may be configured to determine the particular cloud service being requested and identify a number of pods that may have been pre-configured for that particular cloud service. The number of pods that are allocated for an order may depend upon the size/amount/level/ scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1202 as part of the provisioning process. Cloud infrastructure system 1202 may generate an application ID and select a storage virtual machine for an application from among storage virtual machines provided by cloud infrastructure system 1202 itself or from storage virtual machines provided by other systems other than cloud infrastructure system 1202.

Cloud infrastructure system 1202 may send a response or notification 1244 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1202 and information identifying a chatbot system selected by cloud infrastructure system 1202 for the chatbot system corresponding to the chatbot system ID.

Cloud infrastructure system 1202 may provide services to multiple customers. For each customer, cloud infrastructure system 1202 is responsible for managing information related to one or more subscription orders received from the customer, maintaining customer data related to the orders, and providing the requested services to the customer. Cloud infrastructure system 1202 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1202 may provide services to multiple customers in parallel. Cloud infrastructure system 1202 may store information for these customers, including possibly proprietary information. In certain examples, cloud infrastructure system 1202 includes an identity management subsystem (IMS) 1228 that is configured to manage customer information and provide the separation of the managed information such that information related to one customer is not accessible by another customer. IMS 1228 may be configured to provide various security-related services such as identity services, such as information access management, authentication and authorization services, services for managing customer identities and roles and related capabilities, and the like.

Figure 13:
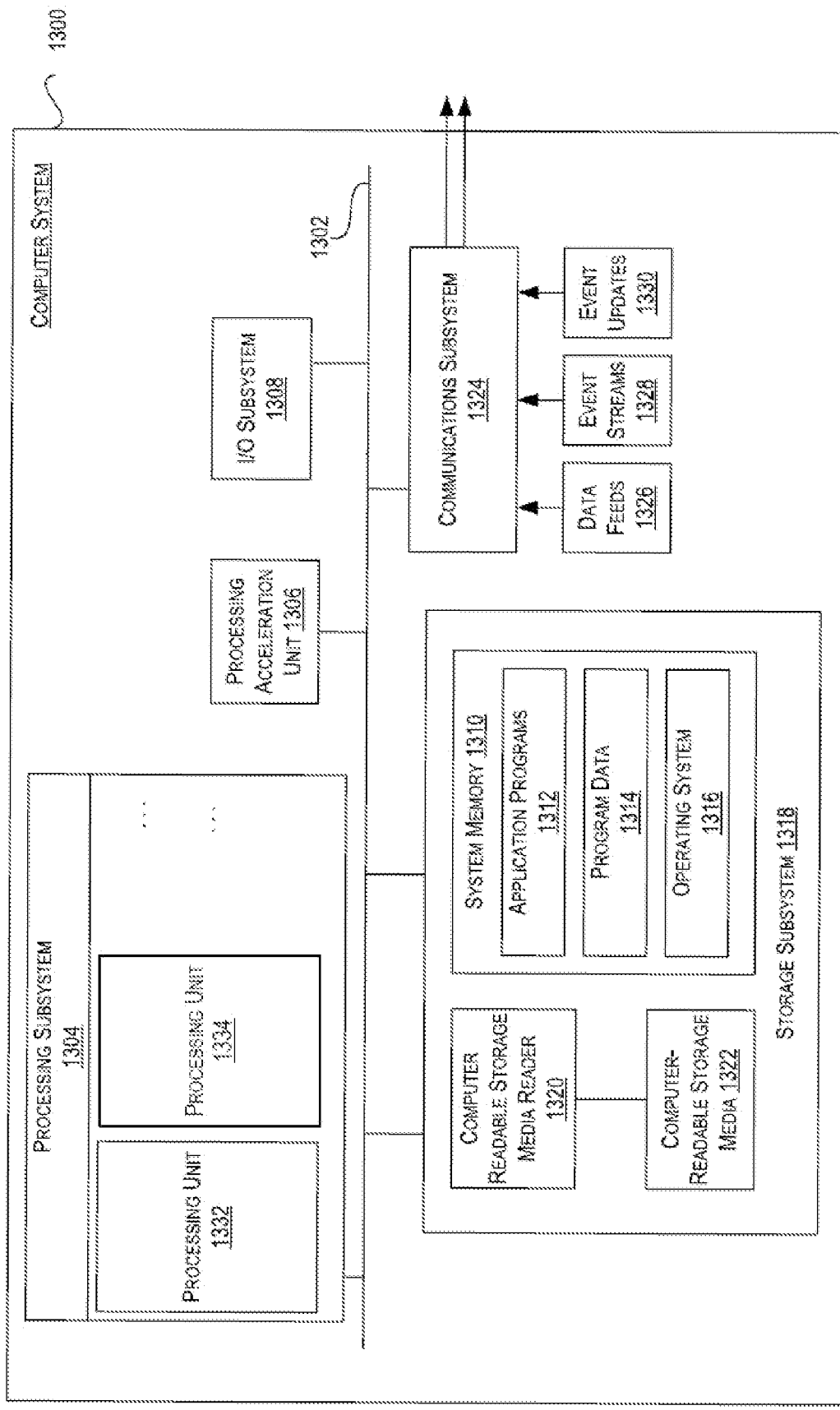
FIG. 13 illustrates an example computer system that may be used to implement various embodiments.

FIG. 13 illustrates an example of computer system 1300. In some examples, computer system 1300 may be used to implement any of the digital assistant or chatbot systems within a distributed environment, and various servers and computer systems described above. As shown in FIG. 13, computer system 1300 includes various subsystems including a processing subsystem 1304 that communicates with a number of other subsystems via a bus subsystem 1302. These other subsystems may include a processing acceleration unit 1306, an I/O subsystem 1308, a storage subsystem 1318, and a communications subsystem 1324. Storage subsystem 1318 may include non-transitory computer-readable storage media including computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative examples of the bus subsystem may utilize multiple buses. Bus subsystem 1302 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1304 controls the operation of computer system 1300 and may include one or more processors, application specific integrated circuits (ASICs), or field programmable gate arrays (FPGAs). The processors may include be single core or multicore processors. The processing resources of computer system 1300 may be organized into one or more processing units 1332, 1334, etc. A processing unit may include one or more processors, one or more cores from the same or different processors, a combination of cores and processors, or other combinations of cores and processors. In some examples, processing subsystem 1304 may include one or more special purpose co-processors such as graphics processors, digital signal processors (DSPs), or the like. In some examples, some or all of the processing units of processing subsystem 1304 may be implemented using customized circuits, such as application specific integrated circuits (ASICs), or field programmable gate arrays (FPGAs).

In some examples, the processing units in processing subsystem 1304 may execute instructions stored in system memory 1310 or on computer-readable storage media 1322. In various examples, the processing units may execute a variety of programs or code instructions and may maintain multiple concurrently executing programs or processes. At any given time, some or all of the program code to be executed may be resident in system memory 1310 and/or on computer-readable storage media 1322 including potentially on one or more storage devices. Through suitable programming, processing subsystem 1304 may provide various functionalities described above. In instances where computer system 1300 is executing one or more virtual machines, one or more processing units may be allocated to each virtual machine.

In certain examples, a processing acceleration unit 1306 may optionally be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term input device is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, micro-phones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1300 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information and data that is used by computer system 1300. Storage subsystem 1318 provides a tangible non-transitory computer-readable storage medium for storing the basic programming and data constructs that provide the functionality of some examples. Storage subsystem 1318 may store software (e.g., programs, code modules, instructions) that when executed by processing subsystem 1304 provides the functionality described above. The software may be executed by one or more processing units of processing subsystem 1304. Storage subsystem 1318 may also provide authentication in accordance with the teachings of this disclosure.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM), dynamic random access memory (DRAM), and the like.

By way of example, and not limitation, as depicted in FIG. 13, system memory 1310 may load application programs 1312 that are being executed, which may include various applications such as Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIXR or UNIX-like operating systems (including without limitation the variety of GNU/Linux operating systems, the Google Chrome® OS, and the like) and/or mobile operating systems such as iOS, Windows Phone, Android® OS, BlackBerry® OS, Palm® OS operating systems, and others.

Computer-readable storage media 1322 may store programming and data constructs that provide the functionality of some examples. Computer-readable storage media 1322 may provide storage of computer-readable instructions, data structures, program modules, and other data for computer system 1300. Software (programs, code modules, instructions) that, when executed by processing subsystem 1304 provides the functionality described above, may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1318 may also include a computer-readable storage media reader 1320 that may further be connected to computer-readable storage media 1322. The computer-readable storage media reader 1320 may receive and be configured to read data from a memory device such as a disk, a flash drive, etc.

In certain examples, computer system 1300 may support virtualization technologies, including but not limited to virtualization of processing and memory resources. For example, computer system 1300 may provide support for executing one or more virtual machines. In certain examples, computer system 1300 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1300. Accordingly, multiple operating systems may potentially be run concurrently by computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices.

Communication subsystem 1324 may support both wired and/or wireless communication protocols. In certain examples, communications subsystem 1324 may include radio frequency (RF) transceiver components for accessing wireless voice and/or data networks (e.g., using cellular telephone technology), advanced data network technology, such as 3G, 4G or EDGE (enhanced data rates for global evolution), WiFi (IEEE 1002.XX family standards, or other mobile communication technologies, or any combination thereof), global positioning system (GPS) receiver components, and/or other components. In some examples, communications subsystem 1324 may provide wired network connectivity (e.g., Ethernet) in addition to or instead of a wireless interface.

Communication subsystem 1324 may receive and transmit data in various forms. In some examples, in addition to other forms, communications subsystem 1324 may receive input communications in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1324 may be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to communicate data from computer system 1300 to other computer systems or networks. The data may be communicated in various different forms such as structured and/or unstructured data feeds 1326, event streams 1328, event updates 1330, and the like to one or more databases that may be in communication with one or more streaming data source computers coupled to computer system 1300.

Computer system 1300 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1300 depicted in FIG. 13 is intended only as a specific example. Many other configurations having more or fewer components than the system depicted in FIG. 12 are possible. Based on the disclosure and teachings provided herein, it should be appreciated that there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to related art techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method performed by one or more data processors, the computer-implemented method comprising:
   obtaining a plurality of historical document images comprising text, the plurality of historical document images corresponding to a plurality of document classes different from each other;
   generating a dictionary using the text of the plurality of historical document images, the dictionary comprising base words occurring with a greatest frequency in each of the plurality of document classes, wherein the base words are extracted from the text of the plurality of historical document images and arranged in datasets by a document class, each of the datasets comprising the base words of a same document class that occur with the greatest frequency within that document class;
   generating a trie structure using the base words of the datasets that occur with a greatest frequency in each of the datasets, the trie structure having a hierarchical architecture and representing all of the plurality of document classes present in the dictionary,
   wherein the trie structure comprises a plurality of nodes comprising:
      a root node at a highest level of the hierarchical architecture, and
      internal nodes and leaf nodes, the internal nodes and the leaf nodes are arranged at lower levels of the hierarchical architecture;
   storing the trie structure in a storage, each of the internal nodes and the leaf nodes storing a name associated with each corresponding node among the internal nodes and the leaf nodes, the internal nodes and the leaf nodes being arranged in an alphabetical order based on the name of the corresponding node, wherein the names of the leaf nodes are keys corresponding to the base words occurring with the greatest frequency in each of the datasets stored in the dictionary, wherein each of the leaf nodes further stores document class information indicating one or more document classes in which the key stored at the leaf node occurs, among the plurality of document classes;
   in response to receiving an input document image, retrieving information stored in the trie structure, the retrieving comprising:
      for each of keywords present in the input document image, searching the trie structure in the alphabetical order starting with the root node, to match each of the keywords with a corresponding key stored in a corresponding leaf node of the trie structure, and
      retrieving the document class information stored in the leaf nodes, the keys of which are matched with the keywords; and
   classifying the input document image into one of the plurality of document classes using the retrieved document class information.

2. The computer-implemented method of claim 1, further comprising:
   prior to the generating the dictionary, extracting the text from the plurality of historical document images, the extracting comprising:
      performing an image processing on the plurality of historical document images, respectively, the image processing comprising at least one from among image transformation, skew correction, image cleaning, image filtering, and image segmentation;
      obtaining a text stream, by performing an optical character recognition (OCR) on the image-processed plurality of historical document images; and
      filtering the text stream.

3. The computer-implemented method of claim 2, wherein:
   the text stream is one of a plurality of text streams, each of the plurality of text streams being obtained based on historical document images belonging to a a-same document class, among the plurality of historical document images, and filtered, and
   the generating the dictionary further comprises processing each of the plurality of text streams by:
      extracting, from a corresponding text stream, text units, each of the text units comprising one word or sequential words,
      for each corresponding text stream, forming N-gram groups, wherein N is a number from 1 to 4, wherein the text units comprising one word are associated with unigrams and form a unigram group, the text units comprising two sequential words are associated with bigrams and form a bigram group, the text units comprising three sequential words are associated with trigrams and form a trigram group, and the text units comprising four or more sequential words are associated with quadrams and form a quadram group, among the N-gram groups, arranging the text units of each of the N-gram groups in a descending frequency order, as an ordered group of the text units of a corresponding N-gram group, and selecting a predetermined number of the text units having a greatest frequency within each ordered group; and generating the datasets by the document class, each of the datasets comprising the selected text units of each of the N-gram groups of the corresponding text stream as the base words of a corresponding document class.

4. The computer-implemented method of claim 1, wherein the generating the trie structure further comprises:

arranging the base words in each of the datasets in a descending frequency order, as an ordered group of each dataset per document class;

selecting a predetermined number of the base words having the greatest frequency within each ordered group, wherein the selected base words correspond to the keys; and storing the keys in the alphabetical order in the leaf nodes.

5. The computer-implemented method of claim 1, wherein the classifying the input document image further comprises:

calculating a similarity score between the input document image and the plurality of document classes, respectively, by summing, for each of the plurality of document classes, a number of times each of the keywords occurs in a corresponding document class, based on the document class information associated with the matched keys, thereby obtaining a plurality of similarity scores for the plurality of document classes, respectively;

determining whether the plurality of similarity scores includes a greatest similarity score for one document class or multiple document classes, among the plurality of document classes; and based on the determining that the greatest similarity score corresponds to the one document class, classifying the input document image into the one document class associated with the greatest similarity score.

6. The computer-implemented method of claim 5, wherein the determining whether the plurality of similarity scores includes the greatest similarity score for the one document class or the multiple document classes further comprises:

determining that the plurality of similarity scores includes the greatest similarity score corresponding to the multiple document classes; and based on the greatest similarity score corresponding to the multiple document classes, classifying the input document image based on a frequency of the base words in each of the multiple document classes.

7. The computer-implemented method of claim 6, wherein the classifying the input document image based on the frequency of the base words further comprises:

determining a keyword frequency for each of the keywords for each of the multiple document classes, the keyword frequency corresponding to the frequency with which the base words corresponding to the keywords occur in each of the multiple document classes;

calculating a keyword weight for each of the keywords based on the keyword frequency and a total number of historical document images for each of the multiple document classes, among the plurality of historical document images, thereby obtaining a plurality of keyword weights for the multiple document classes, respectively;

calculating a product weight for each of the multiple document classes, based on the plurality of keyword weights calculated for each of the multiple document classes; and classifying the input document image into a document class associated with a greatest value of the product weight among the multiple document classes.

8. A computer system comprising:

the one or more data processors; and one or more non-transitory computer-readable storage media storing instructions that, when executed by the one or more data processors, cause the one or more data processors to perform the computer-implemented method of claim 1.

9. A computer-program product tangibly embodied in one or more non-transitory machine-readable storage media including instructions configured to cause the one or more data processors to perform the computer-implemented method of claim 1.

10. A computer-implemented method performed by one or more data processors, the computer-implemented method comprising:

obtaining datasets corresponding to a plurality of document classes different from each other, respectively, each of the datasets comprising base words that occur with a greatest frequency within a same document class, wherein the base words are extracted from text of a plurality of historical document images;

based on the datasets, acquiring a trie structure that comprises the base words of the datasets that occur with a greatest frequency in each of the datasets, the trie structure having a hierarchical architecture and representing all of the plurality of document classes present in the datasets, wherein the trie structure comprises a plurality of nodes comprising:

a root node at a highest level of the hierarchical architecture, and internal nodes and leaf nodes, the internal nodes and the leaf nodes are arranged at lower levels of the hierarchical architecture;

wherein the trie structure is stored in a storage, each of the internal nodes and the leaf nodes storing a name associated with each corresponding node among the internal nodes and the leaf nodes, the internal nodes and the leaf nodes being arranged in an alphabetical order based on the name of the corresponding node, wherein the names of the leaf nodes are keys corresponding to the base words occurring with the greatest frequency in each of the datasets, wherein each of the keys of the trie structure occurs in one or more document classes among the plurality of document classes, and wherein each of the leaf nodes further stores document class information indicating the one or more document classes in which the key stored at the leaf node occurs;

obtaining an input document image comprising text having keywords;

based on the input document image, retrieving information stored in the trie structure, the retrieving comprising:

for each of the keywords present in the input document image, searching the trie structure in the alphabetical order starting with the root node, to match each of the keywords; with a corresponding key stored in a corresponding leaf node of the trie structure, and retrieving the document class information stored in the leaf nodes, the keys of which are matched with the keywords; and classifying the input document image into one of the plurality of document classes using the retrieved document class information.

11. The computer-implemented method of claim 10, wherein the classifying the input document image further comprises:

calculating a similarity score between the input document image and the plurality of document classes, respectively, by summing, for each of the plurality of document classes, a number of times each of the keywords occurs in a corresponding document class, based on the document class information associated with the matched keys, thereby obtaining a plurality of similarity scores for the plurality of document classes, respectively;

determining whether the plurality of similarity scores includes a greatest similarity score for one document class or multiple document classes, among the plurality of document classes; and based on the determining that the greatest similarity score corresponds to the one document class, classifying the input document image into the one document class associated with the greatest similarity score.

12. The computer-implemented method of claim 11, wherein the determining whether the plurality of similarity scores includes the greatest similarity score for the one document class or the multiple document classes further comprises:

determining that the plurality of similarity scores includes the greatest similarity score corresponding to the multiple document classes; and based on the greatest similarity score corresponding to the multiple document classes, classifying the input document image based on a frequency of the base words that occur in each of the multiple document classes and are stored in respective datasets.

13. The computer-implemented method of claim 12, wherein the classifying the input document image based on the frequency of the base words further comprises:

determining a keyword frequency for each of the keywords for each of the multiple document classes, the keyword frequency corresponding to a frequency with which the base words corresponding to the keywords occur in each of the multiple document classes;

calculating a keyword weight for each of the keywords based on the keyword frequency and a total number of historical document images for each of the multiple document classes, among the plurality of historical document images, thereby obtaining a plurality of keyword weights for the multiple document classes, respectively;

calculating a product weight for each of the multiple document classes, based on the plurality of keyword weights calculated for each of the multiple document classes; and classifying the input document image into a document class associated with a greatest value of the product weight among the multiple document classes.

14. The computer-implemented method of claim 10, further comprising:

prior to the obtaining the datasets, extracting the text from the plurality of historical document images, the extracting comprising:

performing an image processing on the plurality of historical document images, respectively, the image processing comprising at least one from among image transformation, skew correction, image cleaning, image filtering, and image segmentation;

obtaining a text stream, by performing an optical character recognition (OCR) on the image-processed plurality of historical document images; and filtering the text stream.

15. The computer-implemented method of claim 14, wherein:

the text stream is one of a plurality of text streams, each of the plurality of text streams being obtained based on historical document images belonging to a same document class, among the plurality of historical document images, and filtered, and the computer-implemented method further comprises processing each of the plurality of text streams by:

extracting, from a corresponding text stream, text units, each of the text units comprising one word or sequential words, for each corresponding text stream, forming N-gram groups, wherein N is a number from 1 to 4, wherein the text units comprising one word are associated with unigrams and form a unigram group, the text units comprising two sequential words are associated with bigrams and form a bigram group, the text units comprising three sequential words are associated with trigrams and form a trigram group, and the text units comprising four or more sequential words are associated with quadrams and form a quadram group, among the N-gram groups, arranging the text units of each of the N-gram groups in a descending frequency order, as an ordered group of the text units of a corresponding N-gram group, and selecting a predetermined number of the text units having a greatest frequency within each ordered group; and generating the datasets by the document class, each of the datasets comprising the selected text units of each of the N-gram groups of the corresponding text stream as the base words of a corresponding document class.

16. The computer-implemented method of claim 10, wherein the acquiring the trie structure comprises generating the trie structure by:

arranging the base words in each of the datasets in a descending frequency order, as an ordered group of each dataset per document class;

selecting a predetermined number of the base words having the greatest frequency within each ordered group, wherein the selected base words correspond to the keys; and storing the keys in the alphabetical order and the document class information associated with the keys in the leaf nodes.

17. A computer system comprising:

the one or more data processors; and one or more non-transitory computer-readable storage media storing instructions that, when executed by the one or more data processors, cause the one or more data processors to perform the computer-implemented method of claim 10.

18. A computer-program product tangibly embodied in one or more non-transitory machine-readable storage media including instructions configured to cause the one or more data processors to perform the computer-implemented method of claim 10.

* * * * *